United States Patent [19]

Saburi

[11] Patent Number: 4,688,216
[45] Date of Patent: Aug. 18, 1987

[54] STATION RELIEF ARRANGEMENT FOR USE IN RELIEVING OPERATION OF A REFERENCE STATION IN A TDMA NETWORK WITHOUT REDUCTION OF FRAME AVAILABILITY

[75] Inventor: Akio Saburi, Tokyo, Japan

[73] Assignee: NEC Corporation, Japan

[21] Appl. No.: 732,420

[22] Filed: May 9, 1985

[30] Foreign Application Priority Data

May 10, 1984 [JP] Japan .................................. 59-93683
May 10, 1984 [JP] Japan .................................. 59-93684
May 10, 1984 [JP] Japan .................................. 59-93685

[51] Int. Cl.$^4$ .............................................. H04J 3/06
[52] U.S. Cl. .................................. 370/104; 370/105; 370/106
[58] Field of Search ............ 370/104, 106, 105, 110.1, 370/13

[56] References Cited

U.S. PATENT DOCUMENTS 4,393,516  7/1983  Itani .................................... 370/105
4,488,296 12/1984  Yamamoto et al. ................ 370/104
4,555,782 11/1985  Alaria et al. ........................ 370/104

*Primary Examiner*—Douglas W. Olms
*Assistant Examiner*—Curtis Kuntz
*Attorney, Agent, or Firm*—Laff, Whitesel, Conte & Saret

[57] ABSTRACT

In a TDMA satellite communication network comprising a plurality of earth stations, a predetermined one of the stations is operable as a primary reference station for producing a first and a second reference burst to define a multiframe and a frame in an up-link signal, respectively. A synchronization burst is placed at every multiframe by each station with reference to the first and the second reference bursts detected from a down-link signal. A subsidiary reference station is selected from the remaining station to produce a specific one (SY2) of the synchronization bursts and a subsidiary reference burst (SR1) which is placed at the same time instant as the first and the second reference bursts. When the first and the second reference bursts disappear from the down-link signal, each station keeps synchronization with reference to the specific synchronization burst. Thereafter, synchronization is kept in each station with reference to the subsidiary reference station. The subsidiary reference burst may be produced in place of and simultaneously with the first and the second reference bursts when a single carrier frequency and a plurality of carrier frequencies are used in the network, respectively. Use of the plurality of carrier frequencies requires partial modification of hopping operation. The partial modification is possible by selectively producing a modification hopping code representative of modification of the hopping operation.

14 Claims, 19 Drawing Figures

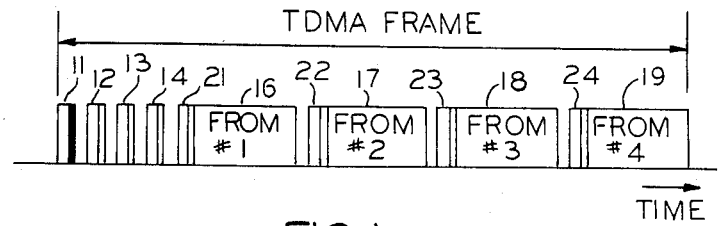
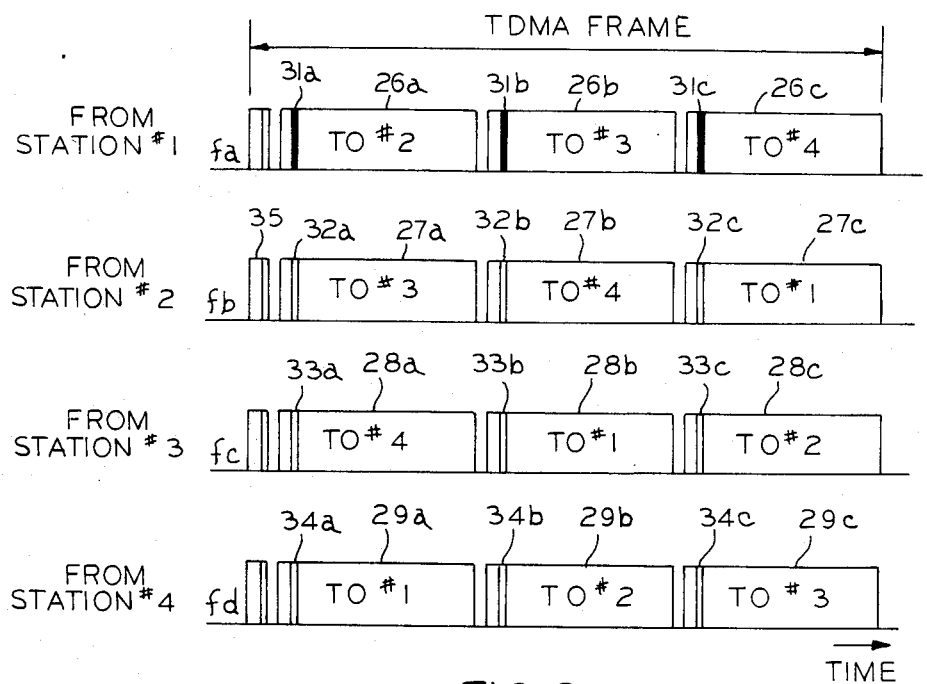
FIG. 2
(PRIOR ART)
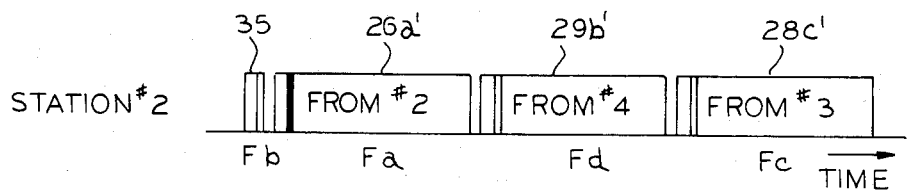
FIG. 3
(PRIOR ART)

FIG. II

STATION RELIEF ARRANGEMENT FOR USE IN RELIEVING OPERATION OF A REFERENCE STATION IN A TDMA NETWORK WITHOUT REDUCTION OF FRAME AVAILABILITY

BACKGROUND OF THE INVENTION

This invention relates to a time division multiple access (often abbreviated to TDMA) satellite communication network comprising a plurality of earth stations (hereinafter simply called stations) and to a station relief arrangement for use in one of the earth stations.

A conventional TDMA satellite communication network comprises a plurality of stations each of which is communicable with one another through a satellite in a time division fashion. For this purpose, each of the stations sends an up-link signal and receives a down-link signal. Each of the up-link and the down-link signals is divisible into a succession of frames each of which includes a plurality of time slots for placing data bursts.

In order to carry out favorable communication in the communication network, accurate synchronization should be established in relation to the frames and the data bursts of each of the up-link and the down-link signals. Otherwise, the data bursts sent from the stations are overlapped or superposed on the other bursts sent from the other stations when each up-link signal reaches a satellite. Overlap of the data bursts makes it impossible to carry out communication among the stations.

A preselected one of the stations is determined as a reference station for producing a succession of reference bursts which define the frames in the up-link signal sent from the reference station. The reference bursts appear through the satellite in each down-link frame and are delivered to each station. The stations establish frame synchronization with reference to the reference bursts included in the down-link signals and thereafter carry out reception and transmission.

Thus, the reference station plays an important role in making the network carry out communication among the earth stations. A fault of the reference station should therefore be avoided. Otherwise, the fault results in disruption of communication.

In U.S. Pat. No. 3,838,221 issued to W. G. Schmidt et al and INTELSAT Specification BG-1-18E (Rev. 2) Mar. 20, 1974, a time division multiple access system is disclosed which comprises a primary reference station and a subsidiary reference station. The primary reference station is operable to produce a succession of primary reference bursts in a manner similar to the reference station mentioned above. In this system, the subsidiary reference station serves to produce a succession of subsidiary reference bursts in the absence of the primary reference bursts. The subsidiary reference bursts are located at time instants at which the primary reference bursts are to be placed. Thus, the subsidiary reference station comprises a station relief circuit for taking over operation of the primary reference station to give relief thereto. At any rate, it is possible for the above-mentioned system to establish the frame synchronization in each station even on occurrence of an faults in the primary reference station.

It is mentioned here that the reference bursts sent from the reference station appear in the down-link after about 0.3 second because of large distance between stations and a satellite. It therefore takes a long time of, for example, several seconds, until the subsidiary reference station detects absence of the primary reference bursts and thereafter produces the subsidiary reference bursts. Under the circumstances, each of the stations must inevitably be operated without the primary and the subsidiary reference bursts before start of production of the subsidiary reference bursts after the primary reference bursts disappear.

As suggested before, the data bursts should be allotted to the time slots of each frame which are determined for the stations, respectively. In other words, phases of the data bursts must also be precisely controlled in each frame to assign the data bursts to the time slots, respectively. Synchronization for determining the phases of the data bursts will be called burst synchronization.

For this purpose, a synchronization signal is generally included in a data burst sent from each station and is returned as a received synchronization signal back to the same station. A received time instant of the received synchronization signal is compared with a reception reference instant assigned to each station to calculate a difference between the received time instant and the reception reference instant. Each station controls a transmission timing of the data burst with reference to the difference so that each data burst is arranged in a predetermined one of the time slots assigned to each station.

In an article contributed by Watanabe et al to 3rd International Conference on Digital Satelite Communications held at Kyoto, Japan, in 1975, under the title of "A New TDMA System for Domestic Service and its High Speed PSK Modem," description is made as regards a method of arranging a plurality of synchronization bursts which have the same format as the primary reference burst and are delivered from the respective stations in each frame in addition to each primary reference burst and the data bursts. As will later be described with reference to one figure of the accompanying drawing, the synchronization bursts are used for burst synchronization in the respective stations. In this method, each frame is divided into a synchronization part for frame and burst synchronization and an information part for the data bursts.

A subsidiary reference station is determined like in the above-mentioned system. A subsidiary one of the synchronization bursts is produced from the subsidiary reference station and positioned in each frame together with the primary reference burst.

Let the primary reference burst from the primary reference station disappear for some reason or other in each frame. In this event, each station keeps and establishes synchronization with reference to the subsidiary synchronization burst instead of the primary reference burst.

With this method, each station can quickly be switched from reception of the primary reference burst to reception of the subsidiary synchronization burst after disappearance of the primary reference bursts, as described by Watanabe et al.

Furthermore, each receiving end of the stations can be designed so that frame synchronization can respond to both of the primary reference bursts and the subsidiary synchronization bursts because the subsidiary synchronization bursts are located at a predetermined time instant as well as the primary reference bursts.

However, this method is disadvantageous in that the information part has a reduced rate in each frame with an increase of the number of participating stations because all of the synchronization bursts are disposed in each frame. As a result, a frame availability is reduced as the number of the stations increases.

In another article No. 80-6489, contributed by K. Kohiyama et al to AIAA (American Institute of Aeronautics and Astronautics), 1980, under the title of "Demand Assigned TDMA System for Digitally Integrated Services Network," burst synchronization is carried out in each station with reference to a synchronization burst which appears at every multiframe consisting of a plurality of frames. In other words, the Kohiyama et al article teaches the fact that the synchronization burst may not be produced at every frame for burst synchronization.

No discussion is, however, made in the Kohiyama et al article as regards the station relief.

The above-mentioned description is mainly based on the premise that the up-link and the down-link signals are carried by the use of up-link and down-link carrier frequencies which are common to the stations. In this connection, the above-mentioned time division multiple access system or network may be referred to as a single frequency system.

In the Schmidt et al patent, a multiple frequency system is also described for conveying each of the up-link and the down-link signals by the use of a plurality of up-link and down-link subsidiary carrier frequencies. Each station transmits the up-link signal and receives the down-link signal by switching each of the up-link and the down-link subsidiary carrier frequencies from one to another in a time division fashion. Such switching is called hopping in the art and is controlled in accordance with a burst time plan which is invariably predetermined for the multiple frequency system.

In the multiple frequency system, consideration should be made as regards failure of a primary reference station and relief of the failure, although not described in the above-mentioned patent.

Furthermore, it is preferable that the hopping can flexibly be carried out to produce the subsidiary reference bursts in the subsidiary reference station. In addition, such flexible hopping may realize various kinds of additional services.

SUMMARY OF THE INVENTION

It is an object of this invention to provide a station relief arrangement which is for use in a time division multiple access satellite communication network and which can rapidly take over operation of a primary reference station with a high frame availability.

It is another object of this invention to provide a station relief arrangement of the type described, which is applicable to each of a single frequency system and a multiple frequency system.

It is yet another object of this invention to provide a time division multiple access satellite communication network carrying out communication among a plurality of stations by the use of a single carrier frequency and which can keep synchronization in each station without reducing a frame availability even in the absence of primary and subsidiary reference bursts.

It is still another object of this invention to provide a time division multiple access communication network which can carry out communication among a plurality of stations by the use of a plurality of carrier frequencies and which improves reliability of the system.

It is another object of this invention to provide a hopping device which is for use in the network described above and wherein hopping is flexibly carried out.

A station relief arrangement to which this invention is applicable is for use in a predetermined one of a plurality of earth stations of a time division multiple access satellite communication network. Each of said earth stations is for sending an up-link and for receiving a down-link signal. Each of said up-link and said down-link signals is divisible into a succession of multiframes which have a multiframe period and each of which is divisible into a particular frame and at least one remaining frame. The particular and the remaining frames have a common frame period. Each of the earth stations places a succession of synchronization bursts at the multiframe period in the up-link signal thereby sent. A preselected one of the earth stations is used as a primary reference station for carrying out operation of producing first reference bursts at a first predetermined time instant in the particular frame and second reference bursts at second predetermined time instants which correspond to the first predetermined time instant in each remaining frame. The first and the second reference bursts define the multiframe and the particular and the remaining frames in the up-link signal sent by the primary reference station. The synchronization bursts are placed by each of earth stations with reference to the first and the second reference bursts detected in the down-link signal thereby received. According to this invention, the predetermined one of earth stations is used as a subsidiary reference station and comprises predicting means responsive to the down-link signal received by the subsidiary reference station for predicting the first and the second predetermined time instants, and assigning means coupled to the predicting means for assigning a succession of subsidiary reference bursts to the time instants predicted by the predicting means in the up-link signal sent from the subsidiary reference station to relieve the primary reference station.

According to an aspect of this invention, the subsidiary reference station is included in the TDMA satellite communication network and operable in cooperation with each of the stations to put the station into operation in response to the subsidiary reference bursts on occurrence of a failure in the primary reference station. During absence of the first, second, and subsidiary reference burst, each of the stations keeps synchronization with reference to the synchronization burst sent from the subsidiary reference station.

BRIEF DESCRIPTION OF THE DRAWING

FIG. 1 is a time chart for use in describing a conventional time division multiple access (TDMA) satellite communication network;

FIG. 2 is a time chart for use in describing operation of another conventional TDMA satellite communication network;

FIG. 3 is a time chart for use in describing another operation of the network illustrated in FIG. 2;

DESCRIPTION OF THE PREFERRED EMBODIMENTS

Figure 4:
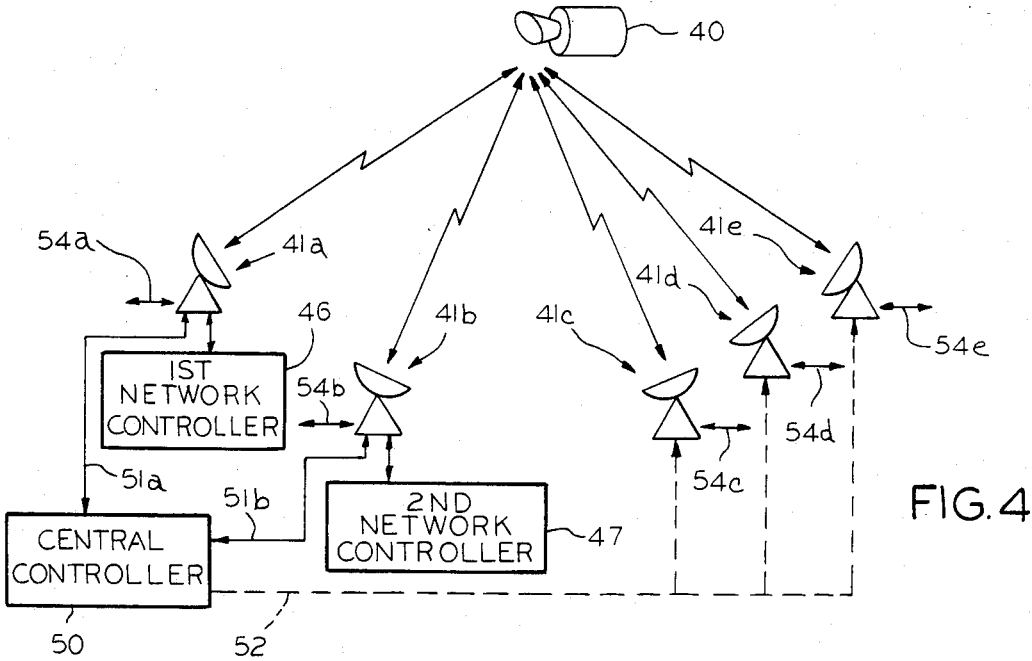
FIG. 4 is a block diagram of a TDMA satellite communication network to which this invention is applicable.

Referring to FIG. 1, description will be made for a better understanding of this invention as regards a conventional time division multiple access (TDMA) satellite communication network which is similar to that disclosed in the above-referenced article by Watanabe et al. In FIG. 1, it is assumed that first through fourth stations participate in the network and are shown at #1, #2, #3, and #4, respectively, and that an up-link signal arrives at a satellite in a time division fashion, as illustrated in FIG. 1. The up-link signal has a succession of frames one of which is exemplified in FIG. 1 and each of which may be named a TDMA frame and is repeated at a frame period. The illustrated up-link signal is carried by the use of a single carrier frequency which is for use in common to the first through the fourth stations #1 to #4.

Herein, let the first and the second stations #1 and #2 be operable as primary and subsidiary reference stations, respectively. A primary reference burst 11 is placed by the first station #1 at a leading portion of the frame while a subsidiary reference burst 12 is placed by the second station #2 after the primary reference burst 11. The primary reference burst 11 includes a frame synchronization signal located at a thick line portion while the subsidiary reference burst 12 includes a subsidiary synchronization signal different from the frame synchronization signal.

The primary reference burst 11 serves to establish frame synchronization when received by each station. The primary reference burst 11 may be used for burst synchronization in the first station #1 in an unusual case. The subsidiary reference burst 12 is normally used for burst synchronization in the second station.

The subsidiary reference burst 12 is successively followed by first and second additional synchronization bursts 13 and 14 which are used for burst synchronization in the third and the fourth stations #3 and #4 and which include synchronization signals different from the frame and the subsidiary synchronization signals. Thus, the first and the second additional synchronization bursts 13 and 14 form a synchronization part of each frame together with the primary and the subsidiary reference bursts 11 and 12. Anyway, all synchronization bursts, such as the primary and the subsidiary reference bursts and the additional synchronization bursts are arranged in each frame.

The synchronization part is succeeded by a data part including first through fourth data bursts 16 to 19 which are sent from the first through the fourth stations #1 to #4, respectively. The first through the fourth data bursts 16 to 19 include synchronization signals 21 to 24 which serve to indicate beginnings of the first through the fourth data bursts 16 to 19, respectively.

In a normal mode of operation, the primary reference burst 11 is delivered in the form of down-link signals to all of the first through the fourth stations through a satellite (not shown) while the second through fourth synchronization bursts 12 to 14 are sent back to the second through fourth stations #2 to #4, respectively. On the other hand, the first through fourth data bursts 16 to 19 are delivered to destined ones of the stations through the satellite in the known manner.

Each station can keep burst synchronization by monitoring the synchronization bursts 11 to 14 sent from the respective stations.

Let the primary reference burst disappear from the illustrated up-link signal. In this event, the subsidiary reference burst 12 can be used for frame synchronization in each station instead of the primary reference burst 11, if it is delivered to all of the stations. Thus, the synchronization signal included in the subsidiary reference burst 12 may be used as a frame synchronization signal. Inasmuch as the subsidiary reference burst 12 is located in the frame in which the primary reference burst 11 is also located, each station can rapidly switch from the primary reference burst 11 to the subsidiary reference burst 12.

However, the system is disadvantageous as pointed out in the preamble of the instant specification because all of the synchronization bursts should be located in each frame.

Referring to FIGS. 2 and 3, another conventional TDMA network will be described so as to facilitate an understanding of this invention and is similar in operation to that described by Schmidt et al in the above-mentioned patent. It is assumed that first through fourth stations #1 to #4 participate in the network like in that described with reference to FIG. 1 and that the up-link signal is divisible into first through fourth partial up-link signals carried by first through fourth partial up-link carrier frequencies fa, fb, fc, and fd, respectively, as shown in FIG. 2, and the down-link signal is divisible into first through fourth partial down-link signals carried by first through fourth partial down-link carrier frequencies Fa, Fb, Fc, and Fd, respectively, as illustrated in FIG. 3. The first through the fourth partial up-link carrier frequencies fa to fd are different from one another and from the first through the fourth partial down-link carrier frequencies Fa to Fd.

Therefore, the illustrated TDMA network will be called a multiple frequency network for simplicity of description.

In FIG. 2, the first station #1 produces the first partial up-link signal by the use of the first partial up-link carrier frequency fa, as illustrated along a top line of FIG. 2 while the second through the fourth stations #2 to #4 produce the second through the fourth partial up-link signals by the use of the second through the fourth partial up-link carrier frequencies fb to fd, as illustrated along second through fourth lines of FIG. 2, respectively.

The first partial up-link signal comprises, in each frame, three data bursts which are to be delivered to the second, the third, and the fourth stations #2, #3, and #4, respectively, and which are denoted by 26a, 26b, and 26c, respectively. Likewise, three data bursts of the second partial up-link signal are to be delivered to the third, the fourth, and the first stations #3, #4, and #1, respectively, and are denoted by 27a, 27b, and 27c, respectively. In addition, data bursts 28a, 28b, and 28c of the third partial up-link signal are to be sent to the fourth, the first, and the second stations #4, #1, and #2, respectively, while data bursts 29a, 29b, and 29c of the fourth partial up-link signal, the first, the second, and the third stations #1, #2, and #3, respectively.

In the example being illustrated, the first station #1 is assumed to be operated as a reference station for frame synchronization and produces a primary frame synchronization signal 31a included in the data burst 26a. The primary frame synchronization signal 31a is sent to the second station #2 and serves to establish frame synchronization in the second station #2. The data bursts 26b and 26c of the first partial up-link signal also include subsidiary frame synchronization signals 31b and 31c which are sent to the third and the fourth stations #3 and #4 so as to establish frame synchronization therein, respectively. The subsidiary frame synchronization signals 31b and 31c are different from each other and from the primary frame synchronization signal.

The remaining data bursts 27a to 27c; 28a to 28c; and 29a to 29c include synchronization signals 32a to 32c; 33a to 33c; and 34a to 34c which are used to indicate beginnings of the respective data bursts in destined stations, respectively.

It is to be noted here that each data burst is sent from each of the first through the fourth stations #1 to #4 to each of the destined stations and is not received back to the same station. No reception of the self-station burst makes it difficult to establish or keep burst synchronization in each station.

In order to keep burst synchronization in each station, synchronization bursts are located at a leading portion of each frame, as shown at 35 in connection with the second partial up-link signal alone. Each synchronization burst, such as 35, is sent from each station (for example, the second station #2) and returned back to the same station through the satellite.

With this network, each station collects the data bursts which are destined thereto and which are carried by three of the first through the fourth partial down-link carrier frequencies Fa to Fd.

In FIG. 3, the second station #2 at first receives its own synchronization burst 35 carried by the second partial down-link carrier frequency Fb corresponding to the second partial up-link carrier frequency fb. Subsequently, the second station #2 selects a received data burst 26a ' which is sent from the first station #1 as the data burst 26a and which is carried by the first partial down-link carrier frequency Fa. Selection of the received data burst 26a ' is followed by selection of a received data burst 29b ' which is sent as the data burst 29b from the fourth station #4 and which is carried by the fourth partial down-link carrier frequency Fd, as shown in FIG. 3. Thereafter, the data burst 28c is selected as a received data burst 28c ' in the above-mentioned manner.

The above-mentioned selection of each data burst is carried out in each station by successively switching the partial down-link carrier frequencies from one to another and is called carrier wave hopping in the art. Similar carrier wave hopping is carried out in each station to receive the data bursts. The carrier wave hopping is controlled in accordance with a burst time plan assigned to each station and is generally invariable in each station.

With the above-mentioned network, each station can utilize a whole of each frame to transmit its data bursts to the satellite in the manner described in conjunction with FIG. 2. As a result, a channel capacity is improved in comparison with the network illustrated with reference to FIG. 1.

The reference station should also be relieved in the multiple frequency network on occurrence of a fault in the reference station. However, no suggestion is offered in the patent and papers referenced to hereinabove.

In addition, it might be preferable to partially change or modify the carrier wave hopping in each station so as to cope with a wide variety of requirements. In this event, it is not beneficial to prepare various kinds of burst time plans for such modifications.

Referring to FIG. 4, a TDMA satellite communication network to which this invention is applicable comprises a satellite 40 and a plurality of earth stations each of which is for sending an up-link signal (described later) and receiving a down-link signal (also described later). First through five ones of the stations 41a, 41b, 41c, 41d, and 41e are illustrated in FIG. 4 and may be located in different realms or countries from one to another, although it is assumed in the following description that all of the stations 41 (suffixes omitted) are present in the same realm.

In FIG. 4, it is also assumed that the up-link signal and the down-link signal are carried by a single up-link carrier frequency and a single down-link carrier frequency, respectively, and that the first and the second stations 41a and 41b are used as a primary and a subsidiary reference station, respectively. In general, the primary and the subsidiary reference stations 41a and 41b are attended stations while the remaining stations are unattended stations.

The primary and the subsidiary reference stations 41a and 41b are coupled to first and second network controllers 46 and 47 which monitor each station through the satellite 40 and which remotely control each station through the satellite 40 by producing a lot of command signals.

A central controller 50 is located in the primary reference station 41a or in a city adjacent to the primary reference station 41a and is coupled to the primary and the subsidiary reference stations 41a and 41b through local lines 51a and 51b on the earth, respectively.

The central controller 50 controls a whole of the illustrated network in cooperation with or in place of the first and the second network controllers 46 and 47.

In addition, the central controller 50 is coupled to the third through fifth stations 41c to 41e through a public telephone or communication network 52 in the example being illustrated. It is possible for the central controller 50 to monitor and control status of each station through the public telephone network 52 and the local lines 51a and 51b on occurrence of failure in the network and/or on initialization thereof.

The first through fifth stations 41a to 41e are coupled to local lines, such as 54a to 54e.

Referring to FIGS. 5 through 10 together with FIG. 4, operation of the TDMA satellite network illustrated in FIG. 4 will be described on assumption that the number of the stations, such as 41a, 41b, is equal to m for generality of description. The network therefore comprises first through m-th stations.

Figure 5:
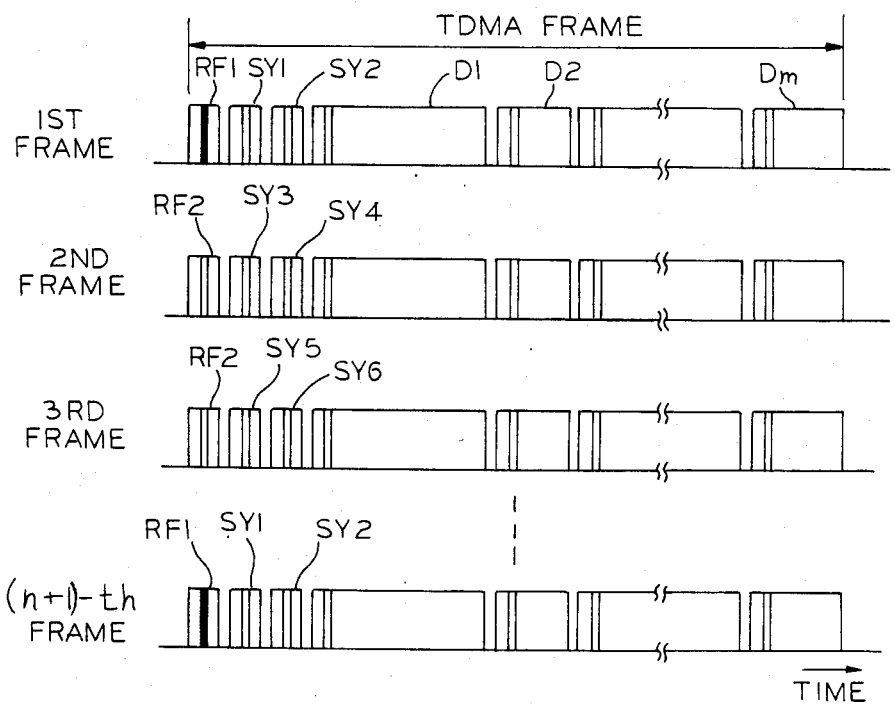
FIG. 5 is a time chart for use in describing transmission operation of a TDMA satellite communication network to which this invention is applicable.

Each of the up-link signal and the down-link signal illustrated in FIG. 5 is divisible into a succession of multiframes which have a multiframe period and each of which is further divisible into first through n-th TDMA frames (simply called frames), as suggested in FIG. 5. The n-th frame is followed by an (n+1)-th frame. In each multiframe, the first or leading frame will be called a particular frame.

Let the number m be equal to twice the number n for brevity of description.

Each frame has a frame period and is separable into a synchronization part and a data part, like in FIG. 1. The data part comprises first through m-th time slots in which first through m-th data bursts D1 to Dm are placed by the first through the m-th stations, respectively.

Figure 6:
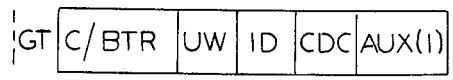
FIG. 6 is an enlarged view of a part of the time chart illustrated in FIG. 5.

A first reference burst RF1 is placed at a beginning time instant, namely, a first predetermined time instant in the synchronization part of the first frame from the primary reference station 41a (FIG. 4). A succession of the first reference bursts RF1 therefore appears at every multiframe. As illustrated in FIG. 6, each of the first reference bursts RF1 is produced after lapse of a predetermined guard time GT and comprises a carrier and bit timing recovery portion (C/BTR), a unique word portion (UW), an identification code portion (ID), a control data channel portion (CDC), and an auxiliary code portion (AUX(1)), all of which are known in the art. For example, the carrier and bit timing recovery portion (C/BTR) is for facilitating recovery of a carrier and a bit timing in a reception demodulator while the identification code portion is for identifying status of a transmitting station. The control data channel portion is for controlling each station by the primary reference station.

It is to be noted here that the unique word portion (UW) illustrated in FIG. 6 is for placing a reference multiframe marker which is transmitted at every multiframe to define the multiframe and which will be indicated at UW1. The reference multiframe marker UW1 has a multiframe pattern.

In FIG. 5, the primary reference station 41a allots second reference bursts RF2 to leading time instants, namely, second time instants of the second through n-th frames. Each of the second reference bursts RF2 is similar in format to that illustrated in FIG. 6 except that the reference multiframe marker UW1 is partially changed to a frame marker UW2.

Figure 7:
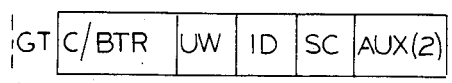
FIG. 7 is a similar view of another view of the time chart illustrated in FIG. 5.

In the example being illustrated in FIG. 5, a first synchronization burst SY1 follows the first reference burst RF1 in the first frame. It is to be noted here that the first synchronization burst SY1 appears only in the first frame and is therefore repeated at the multiframe period. As shown in FIG. 7, the first synchronization burst SY1 is similar to that illustrated in FIG. 6 except that a service channel portion (SC) is arranged in place of the control data channel portion (CDC) so as to report status of each station or to respond to each command. An additional auxiliary portion (AUX(2)) is included in the first synchronization burst SY1. The first synchronization burst SY1 itself carries no command. Instead, the status of the primary reference station is transmitted by the use of the identification code portion (ID).

In FIG. 7, a general multiframe marker UW3 is placed in the illustrated unique word portion (UW) and is different from each of the reference multiframe marker UW1 and the frame marker UW2. The general multiframe marker UW3 is indicative of whether or not each station is synchronized with the multiframe and may be included in both of the first synchronization burst SY1 and each of the data bursts (will be described presently) which is placed in the first frame of the multiframe.

In FIG. 5, the first frame has a second synchronization burst SY2 which follows the first synchronization burst SY1 and which is placed by the subsidiary reference station 41b (FIG. 4). The second synchronization burst SY2 has a format similar to that illustrated in FIG. 7 but comprises a specific unique word UW4 peculiar to the subsidiary reference station 41b and different from the reference multiframe marker UW1, the reference frame marker UW2, and the general multiframe marker UW3.

It should be understood that the first and the second synchronization bursts SY1 and SY2 are produced at every multiframe by the primary and the subsidiary reference stations, respectively. Thus, the synchronization part of the first frame comprises the first reference burst RF1 and the first and the second synchronization bursts SY1 and SY2. An arrangement of the unique words in the first frame is specified by UW1, UW3, and UW4.

Figure 8:
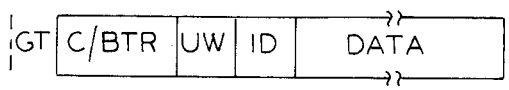
FIG. 8 is a similar view of a further view of the time chart illustrated in FIG. 5.

The synchronization part of the first frame is followed by the data part comprising first through m-th data bursts D1 to Dm sent from the first through the m-th stations, respectively. As shown in FIG. 8, each of the data bursts D1 to Dm comprises a data portion (DATA) in addition to those of a carrier and bit timing recovery portion (C/BTR), a unique word portion (UW), and an identification code portion (ID), like in FIGS. 6 and 7. The illustrated unique word portion (UW) is for arranging a regular synchronization signal UW5.

In the second frame illustrated in FIG. 5, third and fourth synchronization bursts SY3 and SY4 are sent from the third and the fourth stations after the second reference burst RF2 of the second frame. Each of the third and the fourth synchronization bursts SY3 and SY4 has a format similar to that illustrated in FIG. 7. However, the regular synchronization signal UW5 is placed in the unique word portion (UW) of each of the third and the fourth synchronization bursts SY3 and SY4. In a certain case, even UW2 used for a frame marker can be replaced by UW5 in order to reduce the number of UW's.

The first through the m-th data bursts follow the third and the fourth synchronization bursts SY3 and SY4 in the above-mentioned manner.

Likewise, fifth and sixth synchronization bursts SY5 and SY6 are placed after the second reference burst RF2 of the third frame. Thus, two synchronization bursts are successively allotted to each of the following frames until the n-th frame. In the example, it is assumed heretofore that the number m is equal to twice the number n.

Under the circumstances, the first and the second synchronization bursts SY1 and SY2 are recurrently placed in the (n+1)-th frame after the first reference burst RF1. Similarly, the remaining synchronization bursts are recursive at every multiframe. Thus, the synchronization bursts for the respective stations are interspersed in the multiframe. Each frame therefore has a small number of the synchronization bursts as compared with that illustrated in FIG. 1. This means that a large number of the data bursts can be arranged in each frame and a frame availability can be improved in comparison with the system illustrated in FIG. 1.

The number m may not be equal to twice the number n or specifically may be smaller than n. It is to be understood from this fact that no synchronization burst may be placed in a certain one of the frames.

Figure 9:
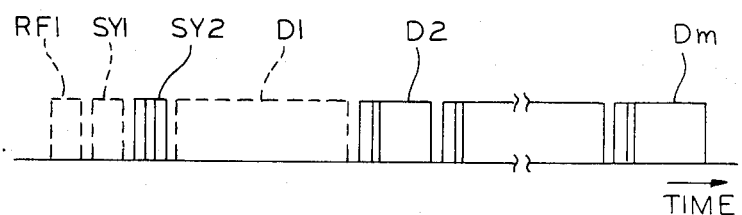
FIG. 9 is a time chart for use in describing usual reception operation of the network illustrated in FIG. 5.

Let the first reference burst RF1 and the first synchronization burst SY1 be extinct from the first frame (FIG. 5), as illustrated in FIG. 9, as a result of a failure of the primary reference station 41a. The second reference burst RF2, of course, disappears from other frames.

In this event, each station is switched from reception of the first and second reference bursts RF1 and RF2 to reception of the second synchronization burst SY2 arranged in the first frame to receive the second synchronization burst SY2 instead of the reference burst. Even though the second synchronization burst SY2 is sent once per multiframe, each station can keep synchronization with reference to the second synchronization burst SY2. In a simple system which does not require any control from the primary reference station, the system may be maintained by using the second synchronization burst SY2 until the primary reference station is restored.

However, in this case, the subsidiary reference station 41b produces a succession of subsidiary reference bursts SR1 each of which is located at a time instant determined for each of the first and the second reference bursts RF1. For this purpose, the subsidiary reference station 41b predicts the time instants of the up-link signal sent from the primary reference station 41a, with reference to the down-link signal therefor. Thereafter, the subsidiary reference bursts SR1 is allotted to the time instant of the up-link signal sent from the subsidiary reference station 41b. The subsidiary reference bursts SR1 are produced at every frame. A first one of the subsidiary reference burst SR1 is placed in the first frame and conveys the multiframe marker UW1 described in conjunction with FIG. 6 to define the multiframe. The remaining ones of the subsidiary reference bursts SR1 are placed in the second through the n-th frames to carry the frame marker UW2.

After production of the subsidiary reference bursts SR1, each station keeps frame synchronization in dependency upon the subsidiary reference bursts SR1 and carries out operation in accordance with commands sent from the subsidiary reference station 41b. Thus, the failure of the primary reference station 41a is relieved by the subsidiary reference station 41b.

Figure 11:
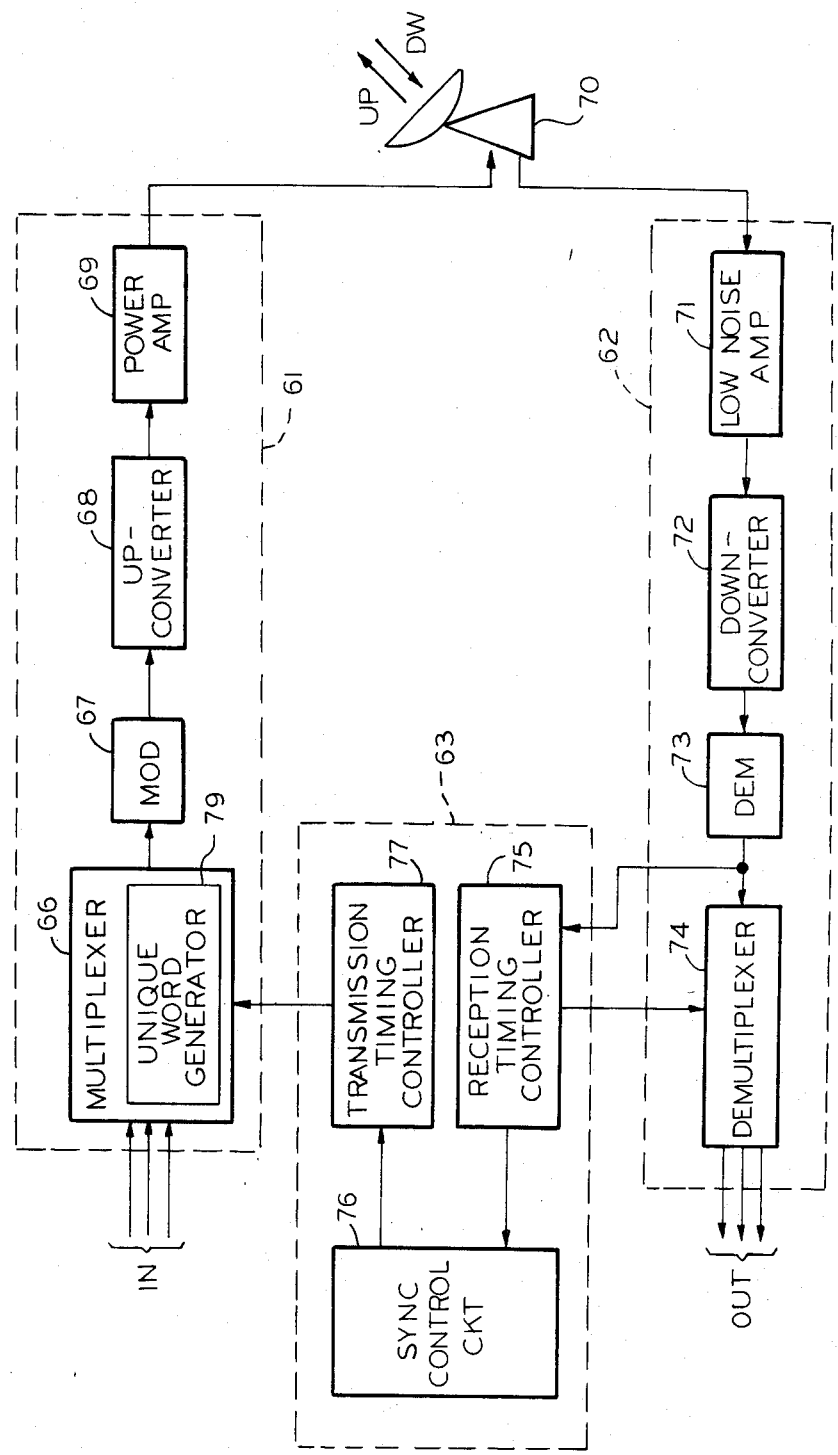
FIG. 11 is a block diagram of a station according to a first embodiment of this invention.

Referring to FIG. 11, an earth station is operable as each of the stations illustrated in FIG. 4 and comprises a transmitting section 61, a receiving section 62, and a synchronization controller 63 for controlling synchronization between the transmitting and the receiving sections 61 and 62, as well known in the art. More particularly, the sychronization control operation of the synchronization controller 63 is for establishing and maintaining the frame synchronization and for performing a burst synchronization function. Although the illustrated station comprises a circuit arrangement according to a first embodiment of this invention, description will at first be directed to a circuit portion except the circuit arrangement.

The transmitting section 61 comprises a multiplexer 66, a modulator 67, an up-converter 68, and a power amplifier 69. Supplied with a plurality of input data signals IN, the multiplexer 66 multiplexes the input data signals under control of the synchronization controller 63 into a multiplexed signal. The multiplexed signal is subjected to quadrature phase shift keying (QPSK) by the modulator 67 to be sent as a transmission intermediate frequency signal of a frequency band of 70 MHz or 140 MHz to the up-converter 68. The transmission intermediate frequency signal is converted into a radio frequency signal of, for example, 6 GHz band to be supplied through the power amplifier 69 and an antenna 70 as an up-link signal UP which is similar to that illustrated in FIG. 5.

A down-link signal DW of, for example, 4 GHz band is received by the antenna 70 and sent through a low noise amplifier 71 of the receiving section 62 to a down-converter 72 to be converted into a reception intermediate frequency signal of 70 MHz or 140 MHz band. The reception intermediate frequency signal is demodulated by a demodulator 73 into a demodulated signal which is supplied to a demultiplexer 74. The demultiplexer 74 separates the demodulated signal into individual output data signals OUT under control of the synchronization controller 63. A combination of the low noise amplifier 71, the down-converter 72, and the demodulator 73 may be referred to as a reception circuit for producing the demodulated signal in response to the down-link signal.

The synchronization controller 63 comprises a reception timing controller 75 responsive to the demodulated signal, a synchronization control circuit 76 coupled to the reception timing controller 75, and a transmission timing controller 77 operable in cooperation with the synchronization control circuit 76.

The transmission control circuit 77 delivers a succession of transmission timing pulses to the multiplexer 66 (FIG. 11) under control of the synchronization control circuit 76. When the illustrated transmission timing controller 77 is used in each of the primary and the subsidiary reference stations 41a and 41b, the transmission timing controller 77 also produces reference timing pulses for the first and the second reference bursts RF1 and RF2 and for the subsidiary reference bursts SR1. Anyway, the transmission timing controller 77 is operable in cooperation with the synchronization control circuit 76 and the reception timing controller 75 so as to predict the time instants of the first and the second reference bursts from the down-link signal DW received through the demodulator 73, when it is used in the subsidiary reference station 41b.

The multiplexer 66 in the subsidiary reference station 41b comprises a unique word generator 79 for producing the multiframe and the frame markers UW1 and UW2 and the specific unique word UW4 in addition to the general multiframe marker UW3 and the regular synchronization signal UW5. Anyway, the unique word generator 79 assigns the subsidiary reference bursts SR1 specified by the multiframe and the frame markers UW1 and UW2 to the time instants for the first and the second reference bursts RF1 and RF2.

Figure 10:
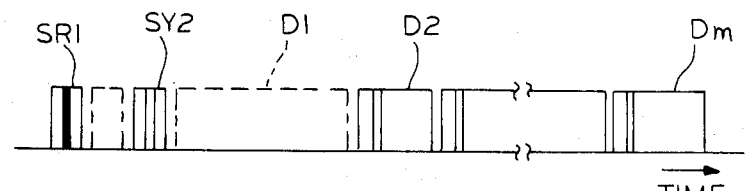
FIG. 10 is a time chart for use in describing unusual reception operation of the network illustrated in FIG. 5.
Figure 12:
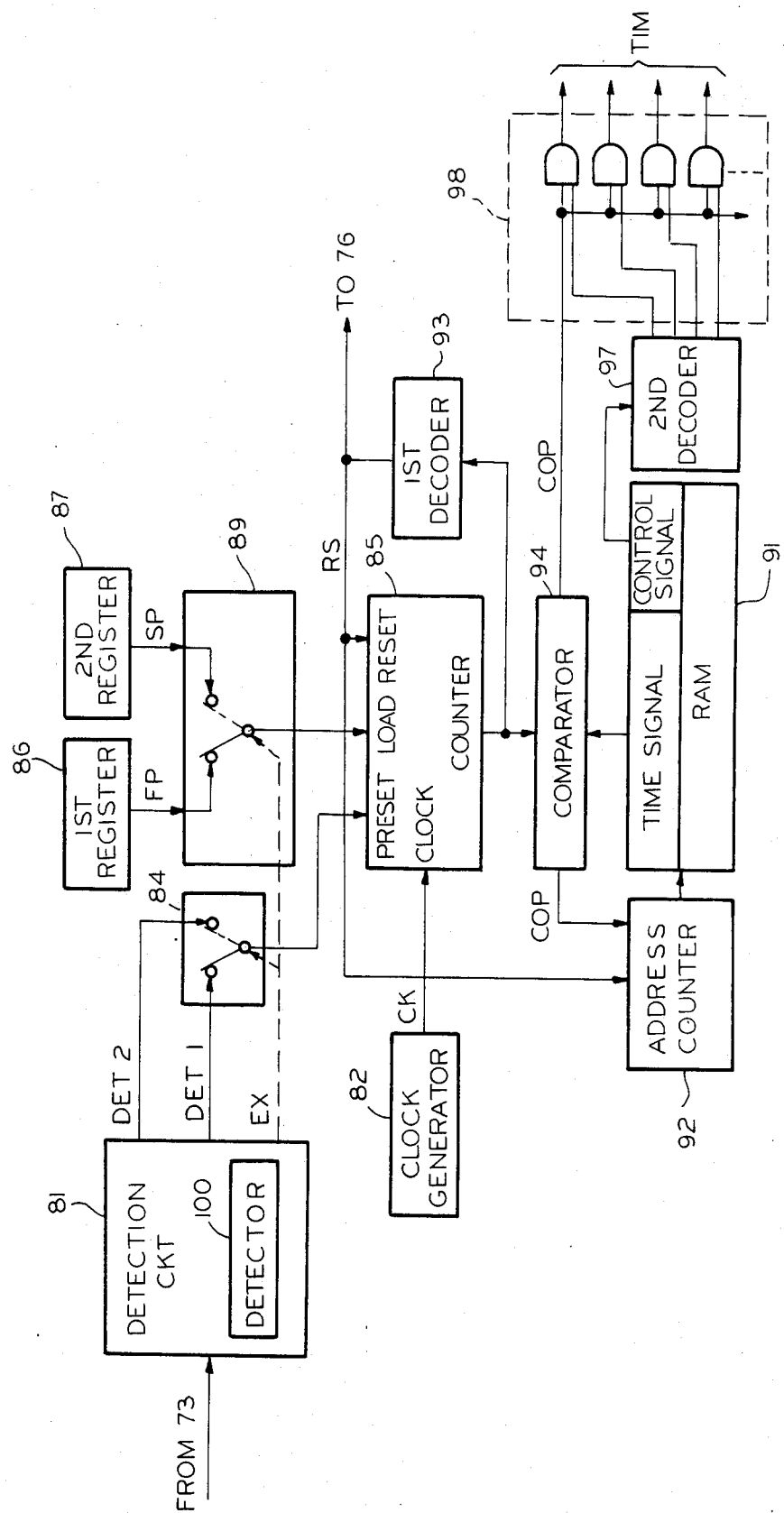
FIG. 12 is a block diagram of a part of the station illustrated in FIG. 11.

Referring to FIG. 12 afresh and FIG. 11 again, the reception timing controller which is shown at 75 in FIG. 11 and illustrated in FIG. 12 in detail is for use in each of the stations illustrated in FIG. 4 and is operable in response to the subsidiary reference bursts SR1 mentioned in conjunction with FIGS. 5, 9, and 10.

It is to be noted here that the down-link signal carries the first or the second reference burst $RF_1$ or $RF_2$ and two of the synchronization bursts, such as SY1 and SY2; SY3 and SY4; in each frame, as illustrated in FIG. 5 and that the same synchronization bursts are repeated at the multiframe period. The illustrated reception timing controller 75 is operable in response to the above-mentioned down-link signal DW, especially, in response to the first or second reference burst $RF_1$ or $RF_2$ and the second synchronization burst SY2 in a manner similar to that described in U.S. Pat. No. 4,054,753 by P. Kaul et al. The difference from the patent is that the second synchronization burst SY2 appears not at the frame period but at the multiframe period.

Furthermore, the synchronization controller 63 can selectively keep synchronization in response to the second synchronization burst SY2 (FIG. 5) produced at the multiframe period by the subsidiary reference station 41b.

More specifically, the reception timing controller 75 comprises a detection circuit 81 supplied with the demodulated signal from the demodulator 73 (FIG. 11) and a clock generator 82 for producing a succession of symbol clocks CK at a symbol rate of, for example, 30 MHz carried by the down-link signal DW. For brevity of description, the symbol clock succession is assumed to be synchronized with each of the down-link and the up-link signals DW and UP.

Supplied with the demodulated signal, the detection circuit 81 detects the first and the second reference bursts RF1 and RF2 to produce a first detection signal DET1 at every frame period. The detection of the first and the second reference bursts RF1 and RF2 is possible by monitoring the reference multiframe marker UW1 and the frame marker UW2. Thus, the detection circuit 81 recognizes both of the first and the second reference bursts RF1 and RF2 as a frame synchronization signal.

The first detection signal DET1 is sent through a switch 84 (described later) to a binary counter 85 of K stages having a preset terminal (PRESET), a load terminal (LOAD), a reset terminal (RESET), and a clock terminal (CLOCK). The counter 85 successively counts the symbol clocks supplied from the clock generator 82 to the clock terminal (CLOCK) and is reset in response to a reset signal RS which will presently be described.

The load terminal (LOAD) of the counter 85 is selectively supplied with first and second preset data signals FP and SP from first and second registers 86 and 87 through a data selector 89, respectively. Each of the first and the second registers 86 and 87 may be a manual digital switch. Each of the first and the second preset data signals FP and SP has K bits and will become clear as the description proceeds.

Supplied with the first detection signal DET1 from the detection circuit 81 to the preset terminal (PRESET), the counter 85 is loaded with either the first or the second preset data signal FP or SP. During presence of the first detection signal DET1, the switch 84 and the data selector 89 select the first detection signal DET1 and the first preset data signal FP, respectively. In this event, the counter 85 is loaded with the first preset data signal FP in synchronism with the first detection signal DET1.

It is to be noted here that the detection circuit 81 produces the first detection signal DET1 by detecting the multiframe and the frame markers UW1 and UW2 present in the first and the second reference bursts RF1 and RF2. As best shown in FIG. 6, each unique word portion UW of the first and the second reference bursts RF1 and RF2 follows the carrier and bit timing recovery portion (C/BTR) and does not appear at a leading edge of each burst.

In order to indicate a phase of each marker in each frame, the first preset data signal FP is preset in the counter 85 in the above-mentioned manner. This present operation may be called a first step toward an establising of the frame synchronization.

Subsequently, the symbol clocks CK are successively counted by the counter 85 to indicate phases or time instants in each frame. The reception timing controller 75 delivers a wide variety of timing signals to the demultiplexer 74 and synchronization control circuit 76 in a manner to be described, so as to process a succession of events predetermined for the phases.

Each event can be specified by a time signal representative of each time instant and a control signal indicative of each control operation necessary for processing each event. A pair of the time signal and the control signal will be collectively called an event signal.

In FIG. 12, the illustrated reception timing controller 75 comprises a random access memory (RAM) 91 having a plurality of addresses for storing a succession of the time signals together with the corresponding control signals.

An address counter 92 is coupled to the random access memory 91 to read the event signals out of the addresses.

A first decoder 93 is supplied with a counter output signal of K bits from the counter 85 to produce the reset signal RS when the counter output signal takes a predetermined pattern. The reset signal RS appears at every frame period and is delivered to the counter 85. This means that the counter 85 can autonomously operate with the frame period without presetting as long as the clock generator 82 supplies accurate symbol clocks. The RS signal is also delivered to the address counter 92 and synchronization control circuit 76.

Now, the counter 85 and the address counter 92 are at first reset by the reset signal RS. Under the circumstances, the first preset data signal FP is set in the counter 85 in response to the first detection signal DET1. The counter 85 successively counts the symbol clocks CK from a count represented by the first preset data signal FP to produce the counter output signal. Under this situation, the counter 85 can continue to operate in a normal manner even though the first detection signal is missed for some reason.

If a previous one of the first detection signal $DET_1$ is correct, it may be judged that the frame synchronization is established. On the other hand, if the first detection signal $DET_1$ is falsely generated as a result of a false detection, the operation of the counter 85 is inevitably disturbed. In order to avoid such a disturbance, the detection circuit 81 is capable of generating only a correct one of the first detection signal $DET_1$. This capability results from the frame synchronization procedure which is carried out by the control circuit 76.

This procedure is well known in the art and therefore, a description of it will not be prolonged at this time.

On the other hand, the address counter 92 specifies a first one of the addresses in response to the reset signal RS. As a result, the random access memory 91 reads a first one of the event signals out of the random access memory 91. The first event signal comprises a first one of the time signals and a first one of the control signals.

A comparator 94 compares the first time signal with the counter output signal to produce a coincidence pulse COP when the first time signal is coincident with the counter output signal. The first control signal is sent to a second decoder 97 to be decoded into a first decoded control signal.

The coincidence pulse COP is delivered to the address counter 92 on one hand and to an output circuit 98 on the other hand. Responsive to the coincidence pulse COP, the address counter 92 is counted up to indicate a second one of the addresses of the random access memory 91.

The output circuit 98 is enabled by the coincidence signal COP to deliver the first decoded control signal to various parts of the synchronization controller 63 and the receiving section 62, especially, to the demultiplexer 74 (FIG. 11) as a set of timing signals TIM.

The following one of the event signals is read out of the second address of the random access memory 91 and delivered to the comparator 94 and the second decoder 97 in the above-mentioned manner. As a result, a second one of the time signals is compared with the counter output signal by the comparator 94 while a second one of the control signals is decoded into a second decoded control signal.

Similar operation is successively carried out to produce a succession of the timing signals TIM until the first decoder 93 detects the predetermined pattern and produces the reset signal RS.

Let the first and the second reference bursts RF1 and RF2 be extinct from the down-link signal DW. In this event, the detection circuit 81 detects extinction of the first and the second reference bursts RF1 and RF2 to produce an extinction signal EX in the known manner.

On extinction of each of the first and the second reference bursts RF1 and RF2, the illustrated reception timing controller 75 is selectively operable in a first mode and a second mode.

In the first mode, the reception timing controller 75 is controlled by the second synchronization burst SY2 (FIG. 5). More specifically, the extinction signal EX is produced by the detection circuit 81 when each of the first and the second reference bursts RF1 and RF2 is not detected over p-consecutive frames where p is a predetermined number. The switch 84 and the data selector 89 are changed over and connected as shown by broken lines in FIG. 12. This means that the reception timing controller 75 can autonomously keep synchronization during the p-consecutive frames even on no detection of the first and the second reference bursts RF1 and RF2.

It is mentioned here that the detection circuit 81 comprises a detector 100 for detecting the second synchronization burst SY2 (FIG. 5). Specifically, the detector 100 monitors the specific unique word UW4 to produce a second detection pulse DET2 representative of detection of the specific unique word UW4 appearing at the multiframe period.

The second detection signal DET2 is sent through the switch 84 to the preset terminal (PRESET) of the counter 85 when the extinction signal EX is produced by the detection circuit 81. In this event, the second preset data signal SP is selected by the data selector 89 in response to the extinction signal EX to be sent to the load terminal (LOAD) of the counter 85. The second preset data signal SP specifies a location or phase of the second synchronization burst SY2, namely, the specific unique word UW4 like the first preset data signal FP and is preset in the counter 85 in synchronism with the symbol clock CK. Thus, the counter 85 is loaded with a time interval between the leading edge of the first frame and the specific unique word UW4.

As mentioned above, the reception timing controller 75 keeps or maintains the frame synchronization with reference to the second synchronization burst SY2.

When each of the first and the second reference bursts RF1 and RF2 appears again over q-consecutive frames where q is a preselected number, the extinction signal EX disappears to put the switch 84 and the data selector 89 into normal states denoted by solid lines, respectively.

Otherwise, the reception timing controller 75 is put into the second mode wherein each station detects the subsidiary reference bursts SR1 from the down-link DW after the subsidiary reference station 41b produces the subsidiary reference burst SR1 as the up-link signal. Each of the subsidiary reference bursts SR1 is placed at the same time instants as the first and the second reference bursts RF1 and RF2. For this purpose, the detection circuit 81 monitors the multiframe marker UW1 and the frame marker UW2 included in the subsidiary reference burst SR1 in the manner described in conjunction with the first and the second reference bursts RF1 and RF2. The subsidiary reference bursts SR1 are produced at every frame period and, therefore, the second mode of operation is carried out at every frame period. Therefore, as long as the reception timing controller 75 is concerned, there is no difference of operation between the second mode of operation and the normal state.

On recovery of the primary reference station 41a from a fault, the second mode of operation is at first changed to the first mode dependent on the second synchronization burst SY2 because the subsidiary reference station ceases the transmission of the subsidiary reference burst SR1, and is thereafter rendered into a normal state controlled by the first and the second reference bursts RF1 and RF2.

Let the illustrated reception timing controller 75 be used in the subsidiary reference station 41b. The reception timing controller 75, the synchronization control circuit 76, and the transmission timing controller 77 serve to predict the time instants for the first and the second reference bursts RF1 an RF2 from the down-link signal DW demodulated by the demodulator 73. The prediction of the time instants is possible in the synchronization control circuit 76 and transmission timing controller 77 by monitoring the first detection signal DET1. The multiplexer 66 is operable in response to a time instant signal representative of the time instants to assign the subsidiary reference bursts $SR_1$ to the time instants indicated by the time instant signal, as mentioned before.

With the above-mentioned network, the subsidiary reference station 41b' may transmit the subsidiary reference bursts SR1 after extinction of the first and the second reference bursts RF1 and RF2 is checked with a high certainty. In other words, the subsidiary reference bursts SR1 may be produced after lapse of a long time (for example, a few seconds). This is because frame synchronization is kept in each station with reference to the second synchronization bursts SY2 sent from the subsidiary reference station.

Practically, no detection of the first and the second reference bursts RF1 and RF2 might result from a failure of the subsidiary reference station 41b. Production of the subsidiary reference bursts SR1 should be stopped when the subsidiary reference station 41b fails. To this end, the subsidiary reference station 41b at first interrupts burst synchronization operation carried out with reference to the first and the second reference bursts RF1 and RF2 when no detection of them lasts p-consecutive frames. The transmission timing controller 77 is free of control of the synchronization control circuit 76. Consequently, self-station bursts, such as SY2, are produced in timed relation to timing pulses of the subsidiary reference station 41b itself.

Under the circumstances, no reception of the self-station bursts means either a suspension of whole transmission or a failure of the subsidiary reference station 41b itself. Accordingly, the subsidiary reference bursts SR1 are never sent to the other stations.

In the example being illustrated, the subsidiary reference bursts SR1 are produced on condition that the subsidiary reference station 41b receives the self-station bursts and at least one synchronization burst sent from the other stations.

After transmission of the subsidiary reference burst SR1, the subsidiary reference station 41b indicates a reference station mode thereof, for example, by the use of the identification code of the second synchronization burst SY2.

On recovery of the primary reference station 41a from a failure, an initial time slot acquisition should be made in a well-known manner similar to the other earth stations and then burst synchronization is established by the use of the first synchronization burst SY1. Thereafter, recovery of the primary reference station 41a is informed by the use of the identification code of the first synchronization burst SY1. When the central controller 50 (FIG. 4) is operable, such status can be informed easier.

The subsidiary reference station 41b stops transmission of the subsidiary reference bursts SR1 when recovery of the primary reference station 41a is informed. In addition, the identification code of the second synchronization burst SY2 is changed from the reference station mode to a subsidiary reference station mode.

The primary reference station 41a produces the first and the second reference bursts RF1 and RF2 when the second synchronization burst SY2 indicates the subsidiary reference station mode and the subsidiary reference bursts SR1 disappear.

Figure 13:
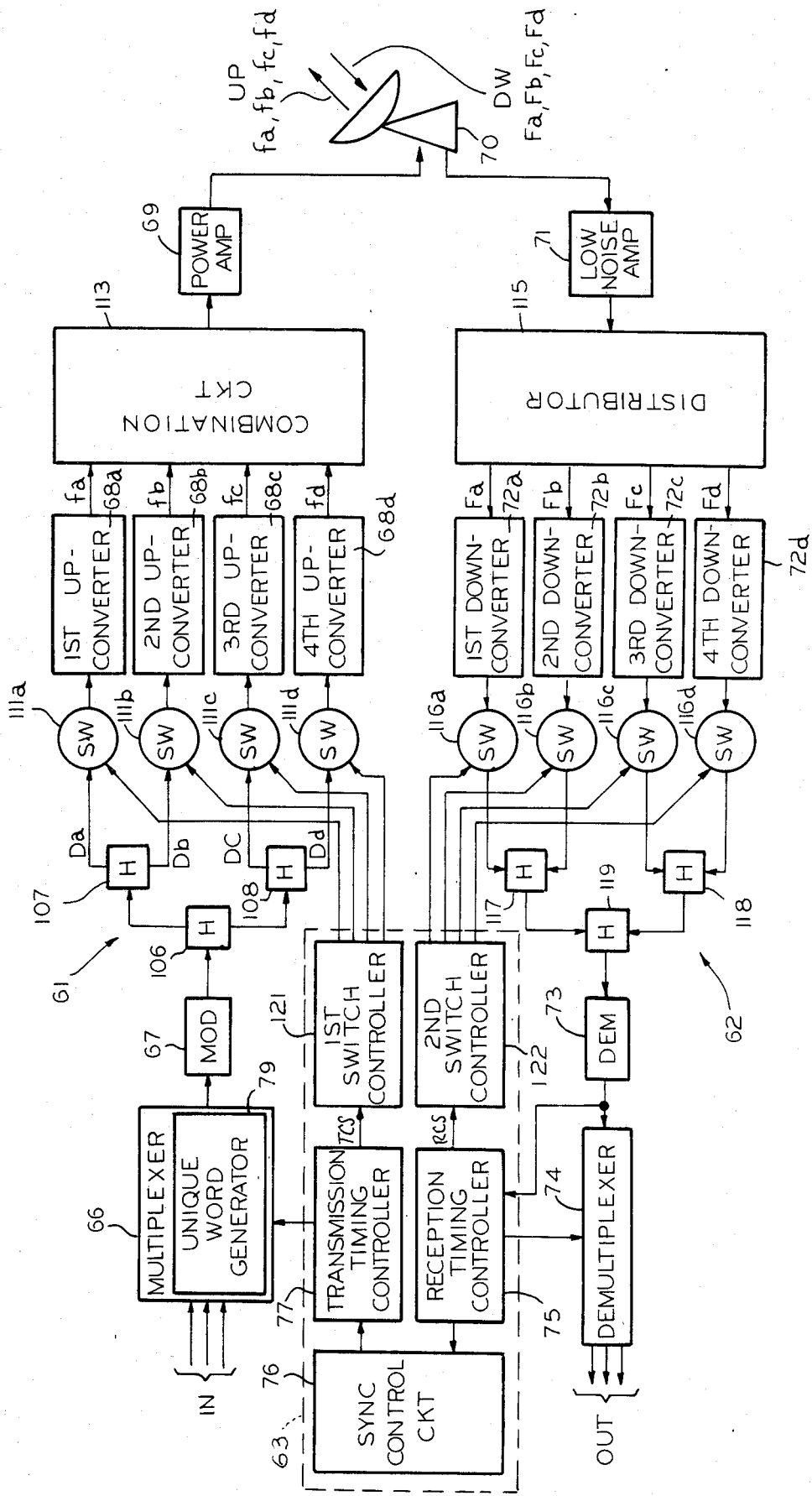
FIG. 13 is a block diagram of a station according to a second embodiment of this invention.

Referring to FIG. 13, an earth station is applicable to TDMA satellite communication network carrying out communication by the use of a plurality of carrier frequencies and comprises similar parts designated by like reference numerals. Although the illustrated station comprises a circuit arrangement according to a second embodiment of this invention, description will at first be made about any other part than the circuit arrangement.

In the example being illustrated, the station transmits an up-link signal UP in the form of first, second, third, and fourth partial up-link signals carried by first, second, third, and fourth partial up-link carrier frequencies fa, fb, fc, and fd, respectively. On the other hand, a down-link signal DW is received in the form of first, second, third, and fourth partial down-link signals carried by first, second, third, and fourth down-link carrier frequencies Fa, Fb, Fc, and Fd.

It is assumed that the partial up-link signal and the partial down-link signals are selected in a time division fashion. In order to transmit and receive the above-mentioned up-link and down-link signals, respectively, the carrier frequencies fa to fd and Fa to Fd should be switched from one to another on transmission and reception with time. For this purpose, carrier wave hopping is carried out in the transmitting section 61 and the receiving section 62 and may be either transponder hopping or frequency hopping, although description will be restricted to the transponder hopping.

In the illustrated transmitting section 61, a plurality of input data signals IN are multiplexed by the multiplexer 66 and thereafter subjected to quadrature phase shift keying by the modulator 67 to be produced as a transmission intermediate frequency signal of, for example, 70 MHz or 140 MHz in the manner described in conjunction with FIG. 11.

The transmission intermediate frequency signal is divided through first, second, and third hybrid circuits 106, 107, and 108 into first, second, third, and fourth divided signals Da, Db, Dc, and Dd. The first through the fourth divided signals Da to Dd are supplied to first through fourth up-converters (indicated at 68a to 68d) through first through fourth diode switches 111a to 111d which are turned on and off in a manner to be described later.

The first through the fourth up-converters 68a to 68d are prepared in one-to-one correspondence to the first through the fourth up-link carrier frequencies fa to fd to produce the first through the fourth partial up-link signals. The first through the fourth partial up-link signals are combined by a combination circuit 113 with one another into a single radio frequency signal. The radio frequency signal is sent through the power amplifier 69 and the antenna 70 as the up-link signal UP to the satellite.

The down-link signal DW is divisible into the first through the fourth partial down-link signals (Fa to Fd) subjected to frequency conversion in the satellite and is supplied through the low noise amplifier 71 to a distributor 115. The first through the fourth partial down-link signals are supplied from the distributor 115 to first through fourth down-converters 72a to 72d for the first through the fourth down-link carrier frequencies Fa to Fd, respectively, and are sent to the demodulator 73 through first through fourth switch circuits 116a to 116d and hybrid circuits 117 to 119. The first through the fourth switch circuits 116a to 116d are similar to the first through the fourth diode switches 111a to 111d and operated in a manner to be described later.

Anyway, the demodulator 73 demodulates a reception intermediate frequency signal into a demodulated signal which is delivered through the demultiplexer 74 to the local lines as the individual output data signals OUT.

In FIG. 13, the illustrated synchronization controller 63 comprises transmission and reception timing controllers 77 and 75, a synchronization control circuit 76, and first and second switch controllers 121 and 122 coupled to the transmission and the reception timing controllers 77 and 75, respectively, like in FIG. 11. The transmission timing controller 77 delivers a transmission control signal TCS of, for example, two bits to the first switch controller 121 under control of the synchronization control circuit 76. Likewise, the reception timing controller 75 delivers a reception control signal RCS of two bits to the second switch controller 122 in response to the demodulated signal.

Responsive to the transmission control signal TCS, the first switch controller 121 supplies the first through the fourth diode switches 111a to 111d with a switching signal. Only one of the first through the fourth diode switches 111a to 111d turned on by the switching signal. Thus, the transmission intermediate frequency signal is successively delivered to one of the up-converters 68a to 68d in a time division fashion. This means that the carrier wave hopping is carried out in the transmitting section 61.

Similarly, the second switch controller 122 produces another switch signal in response to the reception control signal RCS so as to select one of the first through the fourth switch circuits 116a to 116d and to successively carry out the carrier wave hopping in the receiving section 62. As a result of the hopping, only one of the reception intermediate frequency signals is delivered to the demodulator 73 during each time slot and demodulated by the demodulator 73.

Although the carrier wave hopping is carried out in the transmitting and the receiving sections 61 and 62 in the illustrated station, communication is possible between the earth station and the satellite, if hopping is carried out either in the transmitting section 61 or the receiving section 62. However, it is assumed that the hopping is carried out only in the receiving section 62 for brevity of description. In order to carry out the hopping in the transmitting section 62, strict restrictions are practically imposed on frequency stability and stability of a level of the up-link signal. Accordingly, the hopping or hopping operation is readily feasible in the receiving section 62.

Under the circumstances, each of the stations transmits the up-link signal UP to the satellite by the use of only one of the first through the fourth partial up-link carrier frequencies. On the other hand, the receiving section 62 of each station receives the down-link signal DW by hopping the first through the fourth partial down-link carrier frequencies (Fa to Fd).

Like in FIG. 11, let the multiplexer 66 produce the reference multiframe marker UW1 and the reference frame marker UW2 when used in each of the primary and the subsidiary reference stations by the use of the unique word generator 79. Therefore, the multiplexer 66 in the primary and the subsidiary reference stations serve to assign the first and the second reference bursts RF1 and RF2 and the subsidiary reference bursts SR1 in time instants predetermined therefor. In addition, the unique word generator 79 in the subsidiary reference station can produce the specific unique word UW4 to specify the second synchronization burst, such as SY2 (FIG. 5), of the subsidiary reference station. The second synchronization burst SY2 appears at a multiframe period, as illustrated in conjunction with FIG. 5. Furthermore, the multiplexer 66 in each station produces a general multiframe marker UW3 and a regular synchronization signal UW5 similar to those illustrated in FIG. 5.

Figure 14:
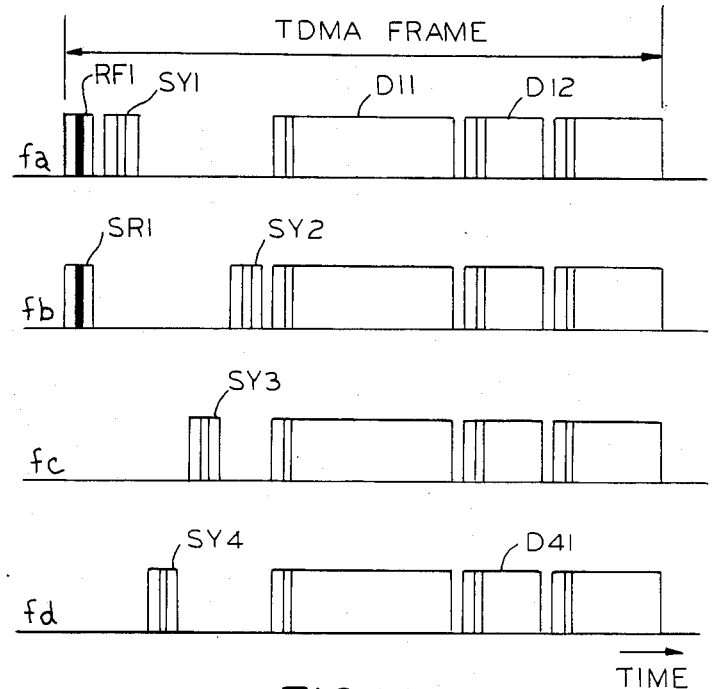
FIG. 14 is a time chart for use in describing transmission operation of a plurality of the stations as illustrated in FIG. 13.

Referring to FIG. 14 together with FIG. 13, it is assumed that the first and the second partial up-link carrier frequencies fa and fb are assigned to the primary and the subsidiary reference stations, respectively, and that the third and the fourth partial up-link carrier frequencies fc and fd are assigned to the other stations. In FIG. 14, the first through the fourth partial up-link signals are carried by the first through the fourth partial up-link carrier frequencies fa to fd, respectively, and are divisible into the multiframes, each of which is further divisible into the first through the n-th frames, as illustrated in FIG. 5, although the first frame alone is shown in FIG. 14.

As readily understood from FIG. 14, each of the first through the fourth partial up-link signals comprises a synchronization part and a data part, like in FIG. 5. The primary reference station produces the first reference burst RF1 specified by the reference multiframe marker UW1 by the use of the first partial up-link carrier frequency fa, as depicted along a top line of FIG. 14. Thereafter, the first synchronization burst SY1 succeeds the first reference burst RF1 and includes the general multiframe marker UW3. After lapse of the synchronization part, data bursts D11, D12 are successively arranged in the data part with the general multiframe markers UW3 carried thereby.

In the second through the n-th frame following the first frame, the second reference bursts RF2 and data bursts are arranged, as readily understood from FIG. 5. Each data burst carries the regular synchronization signal UW5 in the second through the n-th frames. In place of the first synchronization burst SY1, any other synchronization bursts sent from any other stations are arranged in the second through the n-th frames with the regular synchronization signals UW5 included therein. Anyway, the first synchronization burst SY1 and any other synchronization bursts appear at the multiframe period.

As shown along a second line of FIG. 14, the second partial up-link signal produced by the subsidiary reference station carries the subsidiary reference burst SR1 appearing at the same instant as the first and the second reference bursts RF1 and RF2. However, it is to be noted that the subsidiary reference burst SR1 is carried by the second partial up-link carrier frequency fb different from the first partial up-link carrier frequency fa. Therefore, the subsidiary reference burst SR1 never interferes with the first and the second reference bursts RF1 and RF2. A first one of the subsidiary reference bursts SR1 includes the reference multiframe marker UW1 in the first frame while the remaining subsidiary reference bursts SR1 include the frame marker UW2 in the remaining frames.

In addition, a second synchronization burst SY2 is arranged in the first frame of the second partial up-link signal and is displaced relative to the first synchronization burst SY1. It is preferable that the displacement between the first and the second synchronization bursts SY1 and SY2 is large to avoid interference between the first and the second synchronization bursts SY1 and SY2. In the first frame, the second synchronization burst SY2 carries the specific unique word UW4 particular to the subsidiary reference station.

After production of the second synchronization burst SY2, data bursts are arranged in the first frame and are accompanied by the general multiframe marker UW3.

In the remaining frames of the second partial up-link carrier frequency fb, the subsidiary reference bursts SR1 and data bursts convey the frame markers UW2 and the regular synchronization signals UW5, respectively. On the other hand, the second synchronization burst SY2 does not appear in the remaining frames.

As depicted along a third and a fourth line of FIG. 14, third and fourth synchronization bursts SY3 and SY4 are arranged in each first frame of the third and the fourth partial up-link signals (fc and fd), respectively, and are followed by data bursts.

The data bursts of each station may be transmitted simultaneously with the other data bursts of the other stations, as shown in FIG. 14. However, synchronization bursts, such as SY1 to SY4, should not be overlapped, as will become clear later. Therefore, the first through the fourth synchronization bursts SY1 to SY4 are shifted from one another in the synchronization part of the first frame. This applies to the synchronization bursts arranged in the other frames.

Figure 15:
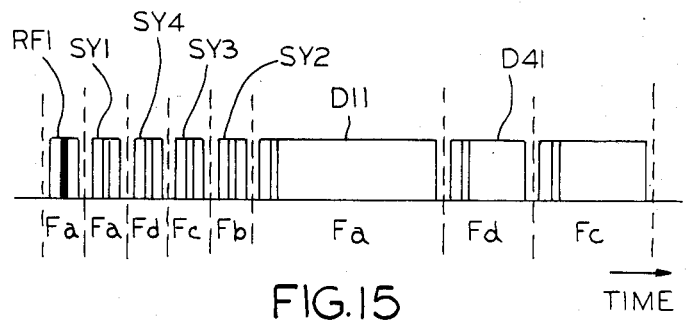
FIG. 15 is a time chart for use in describing usual reception operation of a single one of the stations.

Referring to FIG. 15, it is assumed that the first through the fourth partial up-link carrier frequencies fa to fd are converted by the satellite into the first through the fourth partial down-link frequencies Fa to Fd, respectively, and that the down-link signal DW is correctly received by a certain station. In this event, the station receives the first reference burst RF1 and the first synchronization burst SY1 by selecting the first partial down-link carrier frequency Fa at a leading portion of the first frame. For this purpose, carrier frequency hopping should be carried out at each time instant indicated at broken lines.

After reception of the first synchronization burst SY1, the fourth partial down-link carrier frequency Fd is selected by the hopping to receive the fourth synchronization burst SY4. Subsequently, the third and the second synchronization bursts SY3 and SY2 are successively received by selecting the third and the second partial down-link carrier frequencies Fc and Fb, respectively.

Thereafter, the station receives the data bursts, such as D11, D41, destined thereto by selecting the partial down-link carrier frequencies, such as Fa, Fd.

Similar operation is carried out in the following frames in accordance with a burst time plan kept in the second switch controller 122 (FIG. 13).

When the above-exemplified station is either the primary or the subsidiary reference stations, all of the synchronization bursts, such as SY1 to SY4, are received in order to monitor the status of all stations. On the other hand, the station except the primary and the subsidiary reference stations may not be always necessary to receive all of the synchronization bursts and will be named general stations.

Figure 16:
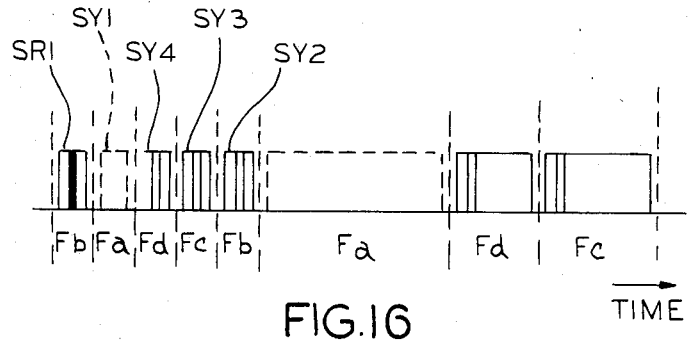
FIG. 16 a time chart for use in describing unusual reception operation of the single station.

Referring to FIG. 15, it is assumed that the first reference burst RF1 and the data burst D11 disappear as a result of occurrence of a failure in the primary reference station. In this event, hopping operation is partially modified in a manner to be described later to receive the subsidiary reference burst SR1 instead of the each of the first and the second reference bursts RF1 and RF2 as shown in FIG. 16.

Description will be made about relief and recovery operation carried out when the primary reference station fails. The relief and recovery operation is carried out in different manners in the primary and the subsidiary reference stations and the general stations and will be individually described in the following.

General Stations (1) When each general station monitors the first and the second reference bursts RF1 and RF2 and an assigned one of the synchronization bursts, hopping control is unconditionally and rapidly converted in each station to receive the subsidiary reference bursts SR1 on detection of disappearance of the first and the second reference bursts RF1 and RF2. Thus, reception of the first and the second reference bursts RF1 and RF2 is switched to reception of the subsidiary reference bursts. This transition operation will be called a forward transition operation.

A reverse transition operation is carried out when the subsidiary reference bursts disappear or the reverse transition operation is indicated by a control command sent from the subsidiary reference bursts SR1.

(2) Let the general stations monitor the first synchronization bursts SY1 sent from the primary reference station, in addition to the first and the second reference bursts RF1 and RF2 and the assigned synchronization bursts. In this event, the forward transition operation is carried out in a manner described in conjunction with the above-mentioned (1) on disappearance of the first and the second reference bursts RF1 and RF2.

The reverse transition operation can be made by an indication included in the first synchronization burst SY1. The indication is sent from the primary reference station to the general stations by the use of the identification cod when the primary reference station is recovered from a failure and can produce the first and the second reference bursts RF1 and RF2 and the first synchronization burst SY1. Previous or normal hopping control is carried out again by detecting the indication included in the first synchronization burst SY1.

(3) Let the general stations monitor the second synchronization burst SY2 sent from the subsidiary reference station in addition to the first and the second reference bursts RF1 and RF2 and the assigned synchronization bursts. In this case, hopping operation is switched to select the subsidiary reference burst SR1 when detection is made about an indication representative of the fact that the subsidiary reference station is operable as a reference station, after detection of disappearance of the first and the second reference bursts RF1 and RF2. The indication may be included in the identification code of the subsidiary reference burst SR1.

The reverse transition operation is possible by monitoring a similar indication carried by the subsidiary reference burst.

In this event, the second synchronization burst SY2 can be used for frame synchronization until reception of the above-mentioned indication, as mentioned in conjunction with FIGS. 11 and 12.

Subsidiary reference station

The subsidiary reference station is put into operation in a dependent mode in accordance with the first and the second reference bursts RF1 and RF2 like the general stations as long as the primary reference station does not fail.

When a failure occurs in the primary reference station, the dependent mode is changed to an independent mode wherein transmission is controlled by an assigned or internal generator. The generator may be a timing generator for use in controlling a local network or the like used in the subsidiary reference station.

Accurate judgement should be made to decide whether or not the reference bursts, such as RF1 and RF2, disappear. For example, the disappearance of the reference bursts may result from a failure of the subsidiary reference station. In this case, the subsidiary reference station should not be changed to the independent mode. For this purpose, the change from the dependent mode to the independent one is made only when the subsidiary reference station receives at least one of the synchronization bursts sent from the other stations together with the synchronization burst sent from the subsidiary reference station itself, in the absence of the reference bursts. This serves to prevent the subsidiary reference station from being wrongly changed from the dependent mode to the independent one.

If the subsidiary reference station is controlled by the central controller 50 (FIG. 4), the above-mentioned wrong change can be avoided because both of the primary and the subsidiary reference stations are controlled and monitored by the central station.

Primary reference station

On recovery from a failure, the primary reference station at first performs the initial time slot acquisition in a well-known manner and establishes synchronization by the use of the subsidiary reference bursts SR1 in a manner similar to the general stations. Finally, the reference bursts, such as RF1 and RF2, are transmitted to indicate the recovery of the primary reference station.

As mentioned above, the subsidiary reference bursts are always transmitted at the same time instants as the first and the second reference bursts by the use of the frequency different from that for the first and the second reference bursts. Status signals and control signals are not transmitted among the stations on taking over operation of each of the primary and the subsidiary reference stations.

Each station can receive the first and the second synchronization bursts SY1 and SY2 at every multiframe period and can therefore decide absence or presence of the reference bursts RF1 and RF2 and the subsidiary reference bursts SR1 by monitoring the first and the second synchronization bursts SY1 and SY2.

Both of the reference bursts RF1 and RF2 and the subsidiary reference bursts SR1 are never adversely affected simultaneously by a failure of a single station.

Anyway, the subsidiary reference station (FIG. 13) is operable to produce the subsidiary reference bursts SR1 at the same time instants as the first and the second reference bursts RF1 and RF2 through the second partial up-link carrier frequency fb different from the first partial up-link carrier frequency fa for the first and the second reference bursts RF1 and RF2. From this fact, it is understood that the reception timing controller 75 in the subsidiary reference station serves to monitor the first partial up-link carrier frequency fa in cooperation with the demodulator 73 and to detect the first and the second reference bursts RF1 and RF2 carried by the first partial down-link carrier frequency Fa. The synchronization control circuit 76 and the transmission timing controller 77 are operable to predict the time instants of the first and the second reference bursts RF1 and RF2 carried by the first partial up-link carrier frequency fa.

In addition, the multiplexer 66 is operable to assign the subsidiary reference bursts SR1 to the time instants predicted to make the second partial up-link carrier frequency Fb carry the subsidiary reference bursts SR1 in cooperation with the first switch controller 121.

In order to favorably carry out the above-mentioned operation, it is preferable that the burst time table is partially modified in each station.

Figure 17:
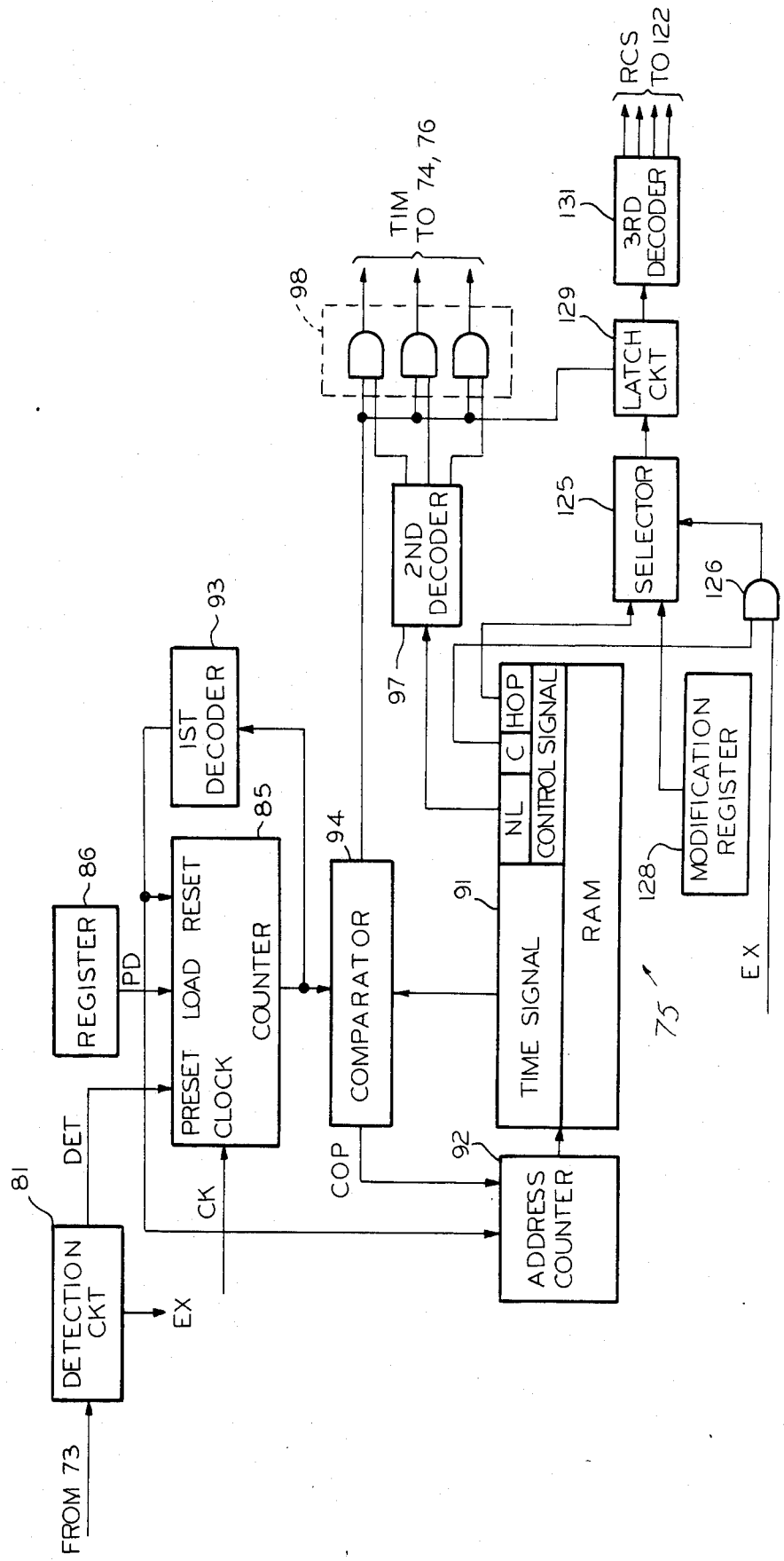
FIG. 17 is a block diagram of a reception timing controller for use in the station illustrated in FIG. 13.

Referring to FIG. 17 afresh and FIG. 13 again, the illustrated reception timing controller 75 comprises similar parts and signals designated by like reference numerals and symbols. In FIG. 17, the detection circuit 81 detects the first and the second reference bursts RF1 and RF2 and the subsidiary reference bursts SR1 from the demodulated signal given from the demodulator 73, like in FIG. 12. The detection circuit 81 produces a detection signal which is similar to the first detection signal DET1 and which is indicated at DET in FIG. 17. Anyway, the detection signal DET is indicative of detection of the first and the second reference bursts RF1 and RF2 and the subsidiary reference bursts SR1 and is sent to the preset terminal (PRESET) of the counter 85. In addition, the detection circuit 81 further produces the extinction signal EX when the first and the second reference bursts are extinct from the demodulated signal. The extinction signal EX may be referred to as a detection result signal.

The counter 85 is reset at every frame period by the reset signal RS supplied from the first decoder 94 and counts the symbol clocks CK in the above-mentioned manner. A single register 86 alone is connected direct to the load terminal (LOAD) of the counter 85 and is similar to the first register 86 (FIG. 12) and keeps a preset data signal PD which is indicative of a location of each unique word included in the first and the second reference bursts RF1 and RF2 and the subsidiary reference bursts SR1. From this fact, it is readily understood that each unique word of the subsidiary reference bursts SR1 appears at the same time instant as each of unique word of the first and the second reference bursts RF1 and RF2.

The counter 85 is loaded with the preset data signal PD each time when the detection signal DET is supplied to the preset terminal (PRESET) of the counter 85. Thereafter, the counter 85 counts the symbol clocks CK to produce the counter output signal of K bits until the reset signal RS is given from the first decoder 93.

The time signals and the corresponding control signals are stored in the random access memory 91 as the event signals, respectively. The random access memory 91 therefore has first area and second area for storing the time signals and the control signals, respectively.

It is to be noted here that the control signals are divisible into normal control signals NL for controlling normal operations, hopping codes HOP for selecting one of the first through the fourth down-link carrier frequencies Fa to Fd, and modification codes C for modifying the usual hopping operation.

It is readily understood that a succession of hopping operation is classifiable into non-modifiable and modifiable hopping operations. The non-modifiable and the modifiable hopping operation are specified by a combination of the hopping code and the modification code.

The second area is therefore subdivided into first through third subdivided areas for the normal control signals NL, the hopping codes HOP, and the modification codes C, respectively. The hopping codes HOP are in one-to-one correspondence to the modification codes C. In the example being illustrated, each hopping code HOP and each modification code C are of two bits and a single bit, respectively. The combination of the modification code of a logic "0" level and the hopping code is representative of the non-modifiable hopping operation and may be called a first internal control signal while the combination of the modification code of a logic "1" level and the hopping code is representative of the modifiable hopping operation and may be called a second internal control signal.

In FIGS. 13, 15, and 16, let hopping be progressive in the manner illustrated in FIG. 15 in order to exemplify the modification codes C and the hopping codes HOP. In a first one of time slots illustrated in FIG. 15, the first down-link carrier frequency Fa should be selected by a first one of the hopping code HOP. When the primary reference station fails, the second down-link carrier frequency Fb must be selected in the first time slot, as illustrated in FIG. 16. From this fact, it is readily understood that the hopping operation may be changed or modified in the first time slot.

Likewise, second and third ones of the hopping codes HOP are produced in second and third ones of the time slots in FIG. 15 and are indicative of selection of the first and the fourth down-link carrier frequencies Fa and Fd, respectively.

Referring back to FIG. 17, the hopping control signal HOP and the modification code C are delivered to a selector 125 and an AND gate 126, respectively. The selector 125 is connected to a modification register 128 which is loaded with a modification hopping code, namely, modified code of two bits and which may be a manual digital switch. The modification hopping code is representative of selection of the second down-link carrier frequency Fb, as understood from FIG. 16.

The AND gate 126 is supplied with the extinction signal EX from the detection circuit 81. In other words the AND gate 126 is enabled only when the first and the second reference bursts RF1 and RF2 disappear. Disappearance of the first and the second reference bursts RF1 and RF2 can be detected by monitoring the first down-link carrier frequency Fa in a known manner.

When the modification code C of the logic "1" level is read out of the random access memory 91 with the AND gate 126 enabled by the extinction signal EX of the logic "1" level, the modification hopping code is selected by the selector 125. Otherwise, the hopping code is selected by the selector 125. The modification hopping code which is selected by the selector 125 is operable to switch the partial down-link carrier frequencies from the first partial down-link carrier frequency Fa to the second one Fb and may be referred to as a switching control signal.

Thus, the modification hopping code is substituted for the hopping code in the first time slot when the first and the second reference bursts RF1 and RF2 are extinct from the first partial down-link signal. Accordingly, the hopping codes are partially modified into the modification hopping code in the above-mentioned manner.

The hopping codes and the modification hopping code are stored in a latch circuit 129 in synchronism with the coincidence pulse COP supplied from the comparator 94 and are decoded by a third decoder 131 into the reception control signal RCS. The reception control signal RCS is selectively sent through the second switch controller 122 to the first through the fourth switch circuits 116a to 116d to carry out selective reception of the first through the fourth down-link carrier frequencies Fa to Fd.

The remaining operations are similar to those illustrated with reference to FIG. 12 and will not be described any longer.

Figure 18:
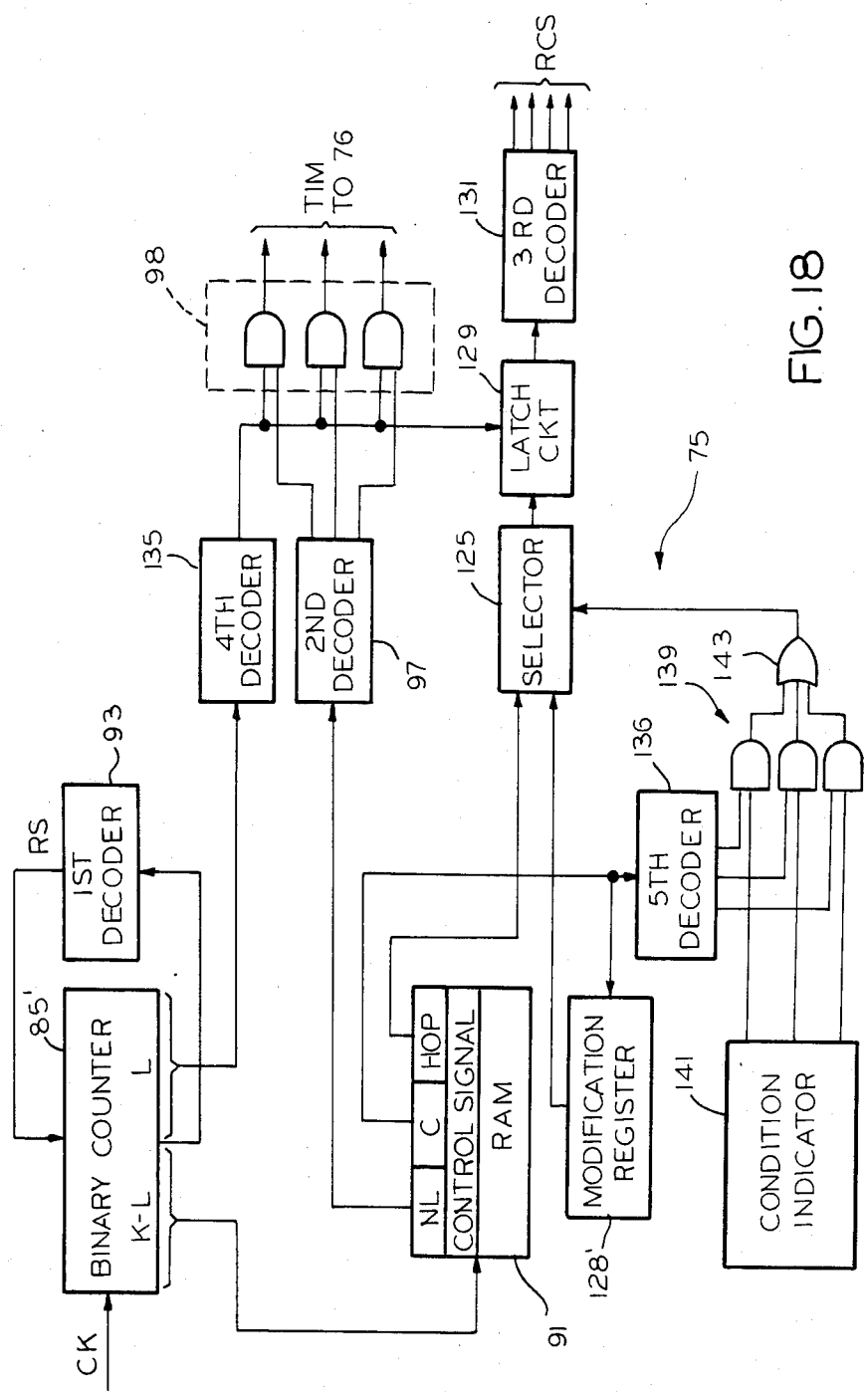
FIG. 18 is a block diagram of another reception timing controller for use in the station illustrated in FIG. 13.

Referring to FIG. 18, another reception timing controller 75 is for use in each station illustrated in FIG. 13 and comprises similar parts and signals designated by like reference numerals and symbols. In FIG. 18, the reception timing controller 75 comprises a binary counter 85' of K stages which counts the symbol clocks CK. The binary counter 85' is connected to the first decoder 94 and reset by the reset signal RS in a manner similar to that illustrated in conjunction with FIG. 17.

It is mentioned here that symbols in each frame are divided into a plurality of units, each having $2^L$ symbols, and that the events are changed from one to another at every unit of $2^L$ symbols. In other words, each frame is subdivided into the units equal in number to $2^{K-L}$ or less. Accordingly, the control signals may be varied at every unit of $2^L$ symbols.

Under the circumstances, the counter output signal of K bits are divided into a higher significant part of $(K-L)$ and a lower significant part of L bits. The higher significant part is directly supplied to a random access memory 91' as an address signal. The address counter 92 (FIG. 17) is therefore not required. The lower significant part is sent to a fourth decoder 135. The fourth decoder 135 produces a succession of additional timing pulses at specific time instants predetermined in each unit. The additional timing pulses are delivered to the output circuit 98 and the latch circuit 129.

Both of the higher and the lower significant parts are sent to the first decoder 93 like in FIG. 17. As a result, the reset signal RS is supplied to the binary counter 85' at every frame period.

The illustrated random access memory 91' stores the normal control signal NL, the modification codes C, and the hopping codes HOP like in FIG. 17. However, it is to be noted that the time signals (FIG. 17) are not stored in the illustrated random access memory 91 and that the modification code C has p-bits. When all of the p-bits take the logic "0" levels, the modification code C is indicative of the fact that the hopping code HOP should not be modified or changed. In addition, the modification code C can indicate time slots equal in number to $2^P-1$ and are delivered to a fifth decoder 136 and an additional register 128'. The additional register 128' is different from the modification register 128 (FIG. 17) in that a plurality of the modification hopping codes are stored in the additional register 128'. The modification hopping codes serve to select one of the first through the fourth down-link carrier frequencies Fa to Fd and may therefore be referred to as frequency selection signals.

The fifth decoder 136 delivers an enable signal to one of AND gates (collectly shown at 139) which are connected to a condition indicator 141. The condition indicator 141 monitors status of each earth station to supply an indication signal of a single bit to a selected one of the AND gates 139 when the status satisfies each of a predetermined conditions. One of the predetermined conditions may be that extinction of the first and the second reference bursts RF1 and RF2 which is represented by the extinction signal EX (FIG. 17). Anyway, the condition indicator 141 is operable in cooperation with the demodulator 73, although not explicitly illustrated in FIG. 18.

The indication signal of the logic "1" level is sent through the selected one of AND gate 139 and an OR gate 143 to the selector 125. During the indication signal of the logic "1" level, the selector 125 selects the modification hopping code which is read out of the modification register 128' in response to the modification code C.

Otherwise, the selector 125 selects each hopping code HOP read out of the random access memory 91.

With this structure, it is possible to substitute, for the hopping codes HOP, the modification hopping codes of $2^P-1$ at maximum. Therefore, hopping operation can be modified under various conditions and is carried out with a high flexibility.

Alternatively, specific bursts may be carried by carrier frequencies changed from one to another at every multiframe. That is, hopping operation may be modified at the multiframe period. In this event, a plurality of the hopping codes HOP may be stored in a memory in correspondence to a single one of the modification codes C and specified by a subsidiary condition in addition to the single one of the modification codes C.

More specifically, the subsidiary condition may be given by monitoring the multiframes and changed from one to another at each multiframe. Accordingly, a specific one of the carrier frequencies can be selected in consideration of the single modification code and the subsidiary condition during a certain one of the multiframes while another one of the carrier frequencies can be selected during the following multiframe.

Figure 19:
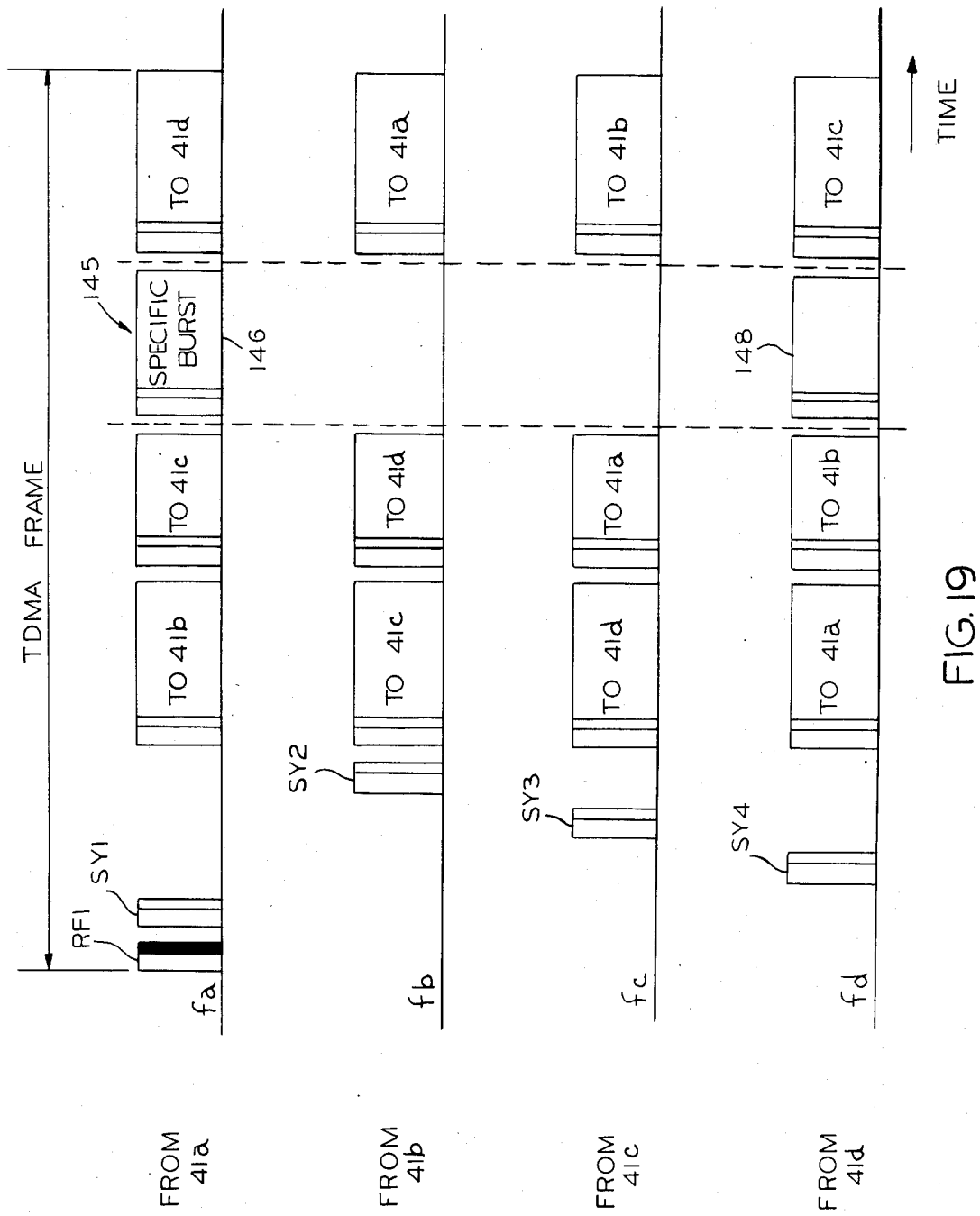
FIG. 19 is a time chart for use in describing another operation of each reception timing controller illustrated in FIGS. 17 and 18.

Referring to FIG. 19, the earth station illustrated in FIG. 13 is applicable to a time division multiple access system operable in a broadcast mode or conference mode. In FIG. 19, the primary reference station 41a, the subsidiary reference station 41b, and two of the general station 41c and 41d will be called first through fourth stations, respectively. It is assumed that a teleconference is held among the first through the third stations 41a to 41c through a broadcast time slot 145 and that the first station 41a transmits a specific burst 146 by the use of the first up-link carrier frequency fa.

Under the circumstances, the second and the third stations 41b and 41c should receive the specific burst 146 during the broadcast time slot 145. If the first up-link carrier frequency fa is converted into the first down-link carrier frequency Fa, the second and the third stations 41b and 41c should select the first down-link carrier frequency Fa during the broadcast time slot 145.

Subsequently, let the second station 41b transmit another specific burst through the broadcast time slot. In this case, the second station 41b may use either the first or the second up-link carrier frequency fa or fb.

If the first up-link carrier frequency fa is used in the second station 41b, hopping operation must be modified in the transmitting section 61 of the second station 41b during the broadcast time slot 145 to select the first up-link carrier frequency fa. Modification of the hopping operation is readily possible in each transmitting section 61, namely, the transmission timing controller 77 in a manner similar to that illustrated in FIGS. 17 and 18. If necessary, transmission may be interrupted by indicating selection of an unused frequency. However, hopping operation may not be changed in each receiving section 62 of the first through the third stations 41a to 41c.

On the other hand, if the second up-link carrier frequency fb is used in the second station 41b to transmit another specific burst, no modification of hopping operation is necessary in the transmission timing controller 77 of the second station 41b. However, each reception timing controller 75 of the first through the third stations 41a to 41b should modify hopping operation to select the second down-link carrier frequency Fb in the manner illustrated in FIGS. 17 and 18. Specifically, the modification codes C are prepared and stored in the random access memory 91 to control the conference mode and are read out of the memory 91 in the broadcast time slot 145. In addition, the modification register 128 (FIG. 17) or the additional register 128' (FIG. 18) must store the modification hopping codes determined for the conference mode. With this structure, a different telecommunication can simultaneously be held by the use of the broadcast time slot 145 by arranging a different burst 148.

While this invention has thus far been described in conjunction with a few embodiments thereof, it will readily be possible for those skilled in the art to put this invention into practice in various other manners. For example, this invention is applicable to the TDMA network comprising only the primary and the subsidiary reference stations. The hopping is not restricted to the transponder hopping but may be frequency hopping which is carried out in a single transponder.

What is claimed is:

1. A reference station relief arrangement for use in a predetermined one of a plurality of earth stations of a time division multiple access satellite communication network, each of said earth stations sending an up-link and receiving a down-link signal, each of said up-link and said down-link signals being divisible into a succession of multiframes which have a multiframe period and each of which is divisible into a particular frame and at least one remaining frame, said particular and said remaining frames having a common frame period, a preselected one of said earth stations being used as a primary reference station for producing first reference bursts at a first predetermined time instant in said particular frame and second reference bursts at second predetermined time instants which correspond to said first predetermined time instant in each remaining frame, said second reference bursts being discriminated from said first reference bursts by said earth stations, said first and said second reference bursts defining said multiframe and said particular and said remaining frames in the up-link signal sent by said primary reference station, each of said earth stations establishing and maintaining frame synchronization with reference to the first and the second reference bursts included in said down-link signal, placing a succession of synchronization bursts at a preassigned position at said multiframe period in the up-link signal sent thereby, and performing burst synchronization by detecting said synchronization bursts with reference to said first and said second reference bursts in the down-link signal received thereby;

wherein the improvement is such that said predetermined one of earth stations is used as a subsidiary reference station can relieve the operation of said primary reference station when said primary reference station becomes faulty, said improvement comprising:

first means for producing at said multiframe period a particular one of said synchronization bursts that is specific to said subsidiary reference station and can be identified from the other synchronization bursts by said earth stations; and second means coupled to said first means for placing said particular one of the synchronization bursts at a third predetermined time instant within said particular synchronization burst in the up-link signal sent thereby while said first and said second reference bursts disappear in the down-link signal received thereby, said particular synchronization burst being kept during disappearance of said first and said second reference bursts to relieve said primary reference station.

2. A reference station relief arrangement as claim in claim 1, wherein said subsidiary reference station comprises:

predicting means responsive to the down-link signal received by said subsidiary reference station for predicting the first and the second predetermined time instants; and assigning means coupled to said predicting means for assigning a succession of subsidiary reference bursts to the time instants predicted by said predicting means in the up-link signal sent from said subsidiary reference station, said primary reference station being relieved by assigning said succession of the subsidiary reference bursts to the time instants predicted by said predicting means.

3. A reference station relief arrangement as claimed in claim 2, said up-link and said down-link signals being carried by a single up-link carrier frequency and a single down-link carrier frequency which are different from each other, respectively, wherein said predicting means of said subsidiary reference station comprises:

monitoring means for monitoring said down-link signals to detect the first and the second reference bursts included in said down-link signals and to produce a detection signal representative of detection of said first and said second reference bursts;

said assigning means of said subsidiary reference station comprising:

transmission control means coupled to said monitoring means for carrying out a transmission of said subsidiary reference bursts when said detection signal disappears during a predetermined interval of time.

4. A reference station relief arrangement as claimed in claim 2, up-link signal being divisible into a plurality of partial up-link signals carried by up-link carrier frequencies different from one another, respectively, while said down-link signal is divisibl into a plurality of partial down-link signals carried by down-link carrier frequencies which are different from one another and from said up-link carrier frequencies, the first and the second reference bursts being carried by a first one of said up-link carrier frequencies and by a first one of said down-link carrier frequencies, said assigning means of said subsidiary reference station comprising:

allotting means operatively coupled to said predicting means for allotting said subsidiary reference burst succession to said predetermined time instants predicted by said prediction means to make a second one of said up-link carrier frequencies carry said subsidiary reference bursts.

5. In a time division multiple access satellite communication network comprising a plurality of earth stations each of which sends an up-link signal and receives a down-link signal, each of said up-link and said down-link signals being divisible into a succession of multiframes which have a multiframe period and each of which is divisible into a particular frame and at least one remaining frame, said particular and said remaining frames having a common frame period, a preselected one of said earth stations being used as a primary reference station for producing first reference bursts at a first predetermined time instant in said particular frame and second reference bursts at second predetermined time instants which correspond to said first predetermined time instant in each remaining frame, said second reference bursts being identified from said first reference bursts by said earth stations, said first and said second reference bursts defining said multiframe and said particular and said remaining frames in the up-link signals sent by said primary reference station, each of said earth stations establishing and maintaining frame synchronization with reference to said first and said second reference bursts in the down-link signal, placing a succession of synchronization bursts at a preassigned position at said multiframe period in the up-link signal sent thereby, and performing burst synchronization by detecting said synchronization bursts with reference to said first and said second reference bursts in the down-link signal received thereby, the improvement wherein:

one of said earth stations except said primary reference station is a subsidiary reference station which can relieve operation of said primary reference station when said primary reference station becomes faulty, said relief station comprising:

first means for producing at said multiframe period a particular one of said synchronization bursts that is specific to said subsidiary reference station and can be identified from the other synchronization bursts by said earth stations; and second means coupled to said first means for placing said particular one of the synchronization bursts at a third predetermined time instant within said multiframe at said multiframe period to keep said particular synchronization burst in the up-link signal sent thereby while said first and said second reference bursts disappear in the down-link signal received thereby, said primary reference station being relieved by keeping said particular synchronization burst during disappearance of said first and said second reference bursts.

6. A time division multiple access satellite communication network as claimed in claim 5, wherein at least one of said earth stations comprises:

means for receiving the down-link signal received thereby to produce a demodulated signal carrying the first and the second reference bursts and the synchronization bursts;

detecting means responsive to said demodulated signal for selectively detecting the first and the second reference bursts and the particular synchronization burst that is sent from said subsidiary reference station to produce first detection signal associated with said first and said second reference bursts and to produce second detection signal associated with said particular synchronization burst.

7. A time division multiple access satellite communication network as claimed in claim 6, wherein said second detection signal is used for maintaining said frame synchronization only in the absence of said first detection signal.

8. A time division multiple access satellite communication network as claimed in claim 5, wherein said subsidiary reference station comprises:

predicting means responsive to the down-link signal received by said subsidiary reference station for predicting the first and the second predetermined time instants; and assigning means coupled to said predicting means for assigning a succession of subsidiary reference bursts to the time instants predicts by said predicting means in the up-link signal sent from said subsidiary reference station to relieve said primary reference station.

9. A time division multiple access satellite communication network as claimed in claim 8, wherein at least one of said earth stations comprises:

means for receiving the down-link signal received thereby to produce a demodulated signal which carries a preselected one of (a) the first and the second reference bursts and the synchronization burst and (b) the subsidiary reference bursts;

detecting means responsive to said demodulated signal for selectively detecting the first and the second reference bursts that are sent from said primary reference station and the subsidiary reference burst and the particular synchronization burst that are sent from said subsidiary reference station to produce a first detection signal associated with said first and said second reference bursts and to produce a second detection signal associated with said particular synchronization burst; and means for establishing and maintaining the frame synchronization in accordance with each of said first and said second detection signals.

10. A time division multiple access satellite communication network as claimed in claim 9, wherein said second detection signal is used for maintaining the synchronization only in the absence of said first detection signal.

11. A time division multiple access satellite communication network as claimed in claim 9, said up-link signal being divisible into a plurality of partial up-link signals carried by up-link carrier frequencies different from one another, respectively, while said down-link signal is divisible into a plurality of partial down-link signals carried by down-link carrier frequencies which are different from one another and from said up-link carrier frequencies, wherein the first and the second reference burst from said primary reference station are carried by a first one of said up-link carrier frequencies and by a first one of said down-link carrier frequencies;

said subsidiary reference burst from said subsidiary reference station being carried by a second one of said up-link carrier frequencies and by a second one of said down-link carrier frequencies.

12. A time division multiple access satellite communication network as claimed in claim 11, wherein at least one of said earth stations comprises:

controllable carrier selection means responsive to a reception control signal received thereby for selecting one of said down-link carrier frequencies to receive a selected one of said partial down-link signals carried by said one down-link carrier frequency;

detecting means responsive to said selected partial down-link signal for detecting the first and the second reference bursts when said one down-link carrier frequency is said first down-link carrier frequency to produce a detection result signal representative of detection and non-detection of the first and the second reference bursts;

reception control means responsive to said detection result signal for producing a switching control signal indicative of switching said down-link carrier frequencies from said first down-link carrier frequency to a second one of said down-link carrier frequencies when said detection result signal is representative of said non-detection of the first and the second reference bursts; and signal supplying means for supplying said switching control signal to said carrier selection means as said reception control signal.

13. A time division multiple access satellite communication network as claimed in claim 12, said carrier selection means being further responsive to a normal control signal to select in a preselected order said down-link frequencies carrying said partial down-link signals, wherein:

said reception control means is for indicating a succession of operation which is to be processed in said at least one earth station in a time division fashion during said frame and which is classifiable into non-modifiable and modifiable operations;

said reception control means comprising:

internal control signal producing means for successively producing first and second internal control signals indicative of said non-modifiable and said modifiable operations, respectively;

code producing means for producing a modified code representative of a preselected one of said carrier frequencies;

indicating means for producing a condition indication signal which is representative of a request for the modifiable operation; and selecting means responsive to said first and said second internal control signals and said condition indication signal for selecting said modified code as said switching control signal when said condition indication signal is representative of said request for the modifiable operation.

14. A reception control circuit for use in a time division multiple access satellite communication network to carry out a succession of operations in a time division fashion by successively selecting a plurality of carrier frequencies one at a time, said operations being divisible into non-modifiable and modifiable operations, wherein the improvement comprises:

internal control signal producing means for successively producing first and second internal control signals indicative of the carrier frequencies selected on said non-modifiable and said modifiable operations, respectively;

indicating means for producing a condition indication which is representative of a request for said modifiable operation;

code producing means for producing a modified code representative of a preselected one of said carrier frequencies;

selecting means responsive to said internal control signals and said control indication, said indicating means, and said code producing means for selecting said modified code as a selected code when said internal control signal which is representative of said modifiable operation is active and said condition indication indicates the request for said modifiable operation; and means for successively selecting one of said carrier frequencies in accordance with said selected code.

* * * * *

UNITED STATES PATENT AND TRADEMARK OFFICE
CERTIFICATE OF CORRECTION

PATENT NO. : 4,688,216
DATED : August 18, 1987
INVENTOR(S) : Saburi

It is certified that error appears in the above—identified patent and that said Letters Patent is hereby corrected as shown below:

Column 1, line 61 "an" should be --any--;

Column 14, line 12 "establising" should be --establishing--;

Column 18, line 1 "signal" should be --signals--;

Column 22, line 20 "cod" should be --code--;

Column 29, line 33 "divisibl" should be --divisible--;

Column 31, line 30 "burst" should be --bursts--.

Signed and Sealed this

Fourth Day of July, 1989

Attest:

DONALD J. QUIGG

Attesting Officer

Commissioner of Patents and Trademarks